United States Patent
Wilhelmsson et al.

(10) Patent No.: US 12,219,483 B2
(45) Date of Patent: Feb. 4, 2025

(54) USE OF WAKE-UP RECEIVER WITH BLUETOOTH LOW ENERGY

(71) Applicant: Telefonaktiebolaget LM Ericsson (publ), Stockholm (SE)

(72) Inventors: Leif Wilhelmsson, Lund (SE); Henrik Sjöland, Lund (SE); Thomas Rimhagen, Linköping (SE); Piergiuseppe Di Marco, Teramo (IT); Magnus Olsson, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 17/441,892

(22) PCT Filed: Sep. 23, 2019

(86) PCT No.: PCT/EP2019/075455
§ 371 (c)(1),
(2) Date: Sep. 22, 2021

(87) PCT Pub. No.: WO2020/192949
PCT Pub. Date: Oct. 1, 2020

(65) Prior Publication Data
US 2022/0201610 A1    Jun. 23, 2022

Related U.S. Application Data

(60) Provisional application No. 62/824,745, filed on Mar. 27, 2019.

(51) Int. Cl.
*H04W 52/02* (2009.01)
*H04W 4/23* (2018.01)
*H04W 76/10* (2018.01)

(52) U.S. Cl.
CPC ......... *H04W 52/0229* (2013.01); *H04W 4/23* (2018.02); *H04W 76/10* (2018.02)

(58) Field of Classification Search
CPC ......... H04W 52/0229; H04W 52/0225; H04W 52/0235; H04W 52/0238; H04W 4/23;
(Continued)

(56) References Cited

U.S. PATENT DOCUMENTS

| | | | |
|---|---|---|---|
| 2017/0026907 A1* | 1/2017 | Min | H04W 52/0216 |
| 2018/0004458 A1 | 1/2018 | Yanagawa | |
| 2018/0063788 A1* | 3/2018 | Yang | H04W 12/108 |
| 2018/0069683 A1* | 3/2018 | Huang | H04W 52/0222 |
| 2018/0234918 A1 | 8/2018 | Asterjadhi et al. | |
| 2019/0110250 A1* | 4/2019 | Huang | H04W 72/0446 |

(Continued)

FOREIGN PATENT DOCUMENTS

| | | | | |
|---|---|---|---|---|
| CN | 108432298 A | * | 8/2018 | H04L 41/0677 |
| CN | 111226467 A | * | 6/2020 | H04W 52/0216 |

(Continued)

OTHER PUBLICATIONS

Giovanelli, D., et al., "Enhancing Bluetooth Low Energy with wake-up radios for IoT applications", 2017 13th International Wireless Communications and Mobile Computing Conference (IWCMC), Jun. 26, 2017, 1622-1627.

*Primary Examiner* — Phong La
(74) *Attorney, Agent, or Firm* — Murphy, Bilak & Homiller, PLLC

(57) ABSTRACT

A method of establishing connection between a first node in a wireless network and a second node in said wireless network, wherein each of said first and second nodes comprise a primary radio receiver and a wake up receiver, each of said nodes comprising a Radio Frequency, RF, switch, arranged to connect one of said primary or secondary radios to a radio antenna, said method comprising the steps of transmitting, by said first node, to a wake-up receiver of a second radio node, a wake-up signal that indicates a frequency channel on which the second radio node is to (Continued)

transmit a response, receiving, by said first node, in response to transmitting said wake-up signal, response from said second radio node on the frequency channel indicated, and establishing, by said first node, a connection between said first and second nodes in order to transfer data between said first and second nodes. The present disclosure also relates to corresponding mesh nodes and a computer program product.

14 Claims, 18 Drawing Sheets

(58) Field of Classification Search
CPC ....... H04W 4/20; H04W 76/10; H04W 76/20; H04W 76/30; H04W 76/40
See application file for complete search history.

(56) References Cited

U.S. PATENT DOCUMENTS

| | | | |
|---|---|---|---|
| 2019/0297575 A1* | 9/2019 | Seok | .................. H04W 52/0229 |
| 2020/0015179 A1* | 1/2020 | Gan | .................. H04W 52/0229 |
| 2020/0077339 A1* | 3/2020 | Nezamfar | .................. H04L 5/10 |

FOREIGN PATENT DOCUMENTS

| | | | | |
|---|---|---|---|---|
| EP | 3493603 B1 * | 2/2021 | ............ | H04W 52/02 |
| KR | 20080113045 A | 12/2008 | | |
| WO | WO 2018021779 A1 * | 7/2017 | | |
| WO | 2018074749 A1 | 4/2018 | | |
| WO | WO 2018204793 A1 * | 5/2018 | | |
| WO | 2018204908 A1 | 11/2018 | | |
| WO | WO-2019051953 A1 * | 3/2019 | ............ | H04W 52/02 |
| WO | 2020192946 A1 | 10/2020 | | |

* cited by examiner

USE OF WAKE-UP RECEIVER WITH BLUETOOTH LOW ENERGY

TECHNICAL FIELD

The present disclosure general relates to the field of communication networks and more specifically to efficient use of wake up receivers in wireless mesh networks.

BACKGROUND

Internet of Things, IoT, is expected to increase the number of connected devices significantly. A vast majority of these devices will likely operate in unlicensed bands, in particular the 2.4 GHz ISM band. At the same time, there is also increased demand for using the unlicensed bands also for services that traditionally have been supported in licensed bands. As an example of the latter, third generation partnership project, 3GPP, that traditionally develop specifications only for licensed bands have now also developed versions of Long Term Evolution, LTE, which will operate in the 5 GHz unlicensed band.

A large number of these IoT devices are expected to be powered by coin-cell batteries, which means that energy consumption is of outmost importance. In the future, it may even be so that these devices will be able to harvest their energy themselves, potentially even further increasing the importance of low energy consumption.

For these kind of applications, the supported data rates are low, both concerning peak data rates and aggregated data rate during, say, an average day. This means that major part of the power is not consumed when the IoT device is transmitting or receiving data, but rather when the devices are listening to determine whether there might be a transmission for which it is the intended receiver.

The fact that such a large part of the total energy consumption is due to listening for a potential transmission, just to find out that the transmission is not there, has motived the development of so-called wake-up receivers, WUR. A WUR is a device which has extremely low power consumption and whose only purpose is to wake up the main transceiver. So, an IoT device with a WUR will not need to turn on the main receiver to scan for a potential packet, but will instead turn on the WUR. If in fact there is data for the IoT device, a wake-up signature, WUS, will be sent to the WUR. When the WUR has decoded this WUS and determined that there in fact is data present it will then wake up the main receiver and transmitter, and a communication link can be established.

An alternative approach for achieving low energy consumption is taken in the Bluetooth Low Energy, BLE, standard. In BLE, the energy constrained device is not listening, but instead transmitting (polling) the other device to determine whether there is any data to receive. This rational for this is that a poll packet may be as short as 400 μs, which together with a listening time of around 20 ms, allows the device to be in sleep for most of the time even if a poll packet is sent once every second.

Naturally, the approach in BLE is better suited if the low power device is the transmitter rather than the receive for the data, since in this case the initial packet, known as an advertising packet, will have the purpose of initializing a link for data communication since in this case it is known that data is available for transmission. When, the advertising packet instead effectively is a polling packet the efficiency of the protocol will depend on how often the polling actually results in that a data packet will be transmitted.

As briefly mentioned in the previous section, the efficiency of a polling for data will depend on how often there is data available. For many IoT applications, small amount of data is sent at relatively rare occasions, say only once or twice every day. If the acceptable delay is on the order of one second, this means that a polling packet needs to be sent every second and therefore more than 80 000 polling packets will be sent every 24 hours although only two data transmission will be initiated. Even if the power consumption for the device sending the polling packets can be made low, the other party of the link must still have its receiver on all the time in order for the protocol to work as intended. Thus, it is assumed that one of the devices engaged in the communication link is not energy limited.

A second problem with a protocol based on polling is the poor usage of the wireless medium, since almost all transmissions do not result in that any user data is transmitted. For BLE, where the advertising channels already today are quite congested, this means that scarce resources are used very inefficiently, potentially negatively impacting legacy systems relying on the advertising channels.

A third problem with a protocol based on polling is that it does not scale well in the sense that if a large number of low intensity IoT devices are to be supported, each one of these devices would need to perform the polling. This does not only have the drawback that the wireless channel gets severely congested, it also implies that the reliability of the polling packets degrades.

Finally, and perhaps the largest problem with a protocol based on polling, is that the protocol assumes that the listening device is actually listening. Taking a specific example, suppose that the BLE protocol is used and the advertiser is a door lock, whereas the scanning device is mobile phone. The use case would correspond to a person coming home, and when the phone is within range it should allow for using the phone to open the door. Now, BLE is used for numerous applications e.g. for synchronizing smart watches. If such a synchronization would be going on at the same time as the door lock is sending advertising packets, there is an obvious risk that the advertising packet will not be correctly received. If, on the other hand, the mobile phone would initiate the transmission to the door lock, once the app in the mobile phone for opening the door lock is started the mobile phone would easily be able to schedule this to happen in a time-multiplexed fashion while still synchronizing with the smart watch.

SUMMARY

In a first aspect of the present disclosure, there is presented a method of establishing connection between a first node in a wireless mesh network and a second node in said wireless mesh network, wherein each of said first and second nodes comprise a primary radio receiver and a wake up receiver, each of said nodes comprising a Radio Frequency, RF, switch, arranged to connect one of said primary or secondary radios to a radio antenna, said method comprising the steps of transmitting, by said first node, to a wake-up receiver of a second radio node, a wake-up signal that indicates a frequency channel on which the second radio node is to transmit a response, receiving, by said first node, in response to transmitting said wake-up signal, response from said second radio node on the frequency channel indicated, and establishing, by said first node, a connection between said first and second nodes in order to transfer data between said first and second nodes.

Although it is described that the first and second nodes in the wireless network comprise a primary and a wake up receiver, the primary radio receiver is often arranged within a node as transceiver unit capable of both transmitting and receiving messages.

According to an embodiment, in said step of transmitting, said first node transmits said wake-up signal with a bandwidth larger than a bandwidth of a channel selective filter of said second device.

According to an example, said first node is a low power node and said second node is a friend node that has established a friendship relation with said first low power node.

According to an exemplary embodiment, said wake-up signal is transmitted as at least two packets, and wherein the carrier frequency used for transmission of said at least two packets is changed by an amount that is less than or equal to a bandwidth of said transmitted wake-up signal.

In a second aspect of the present disclosure, there is presented a method of transmitting wake-up packets from a first node in a wireless mesh network to a second node in said wireless mesh network, wherein at least said second node comprises a wake-up receiver arranged to receive said wake-up packets and further arranged to, in response to receiving said wake-up packet, activate said second node for receiving further data packets, said method comprising the steps of:
  determining, by said first node, that there is an uncertainty concerning the frequency at which said wake-up receiver of said second node receives said wake-up packets;
  selecting, by said first node, a suitable bandwidth for transmitting said wake-up packet based on said determined uncertainty, and
  transmitting, by said first node said wake-up packet at said selected bandwidth.

In a third aspect of the present disclosure, there is presented a method of transmitting wake-up packets from a first node in a wireless mesh network to a second node in said wireless mesh network, wherein at least said second node comprises a wake-up receiver arranged to receive wake-up packets and further arranged to, in response to receiving said wake-up packet, activate said second node for receiving further data packets, said method comprising the steps of receiving, by said first node, Wake-up receiver, WUR, beacons from said second node, determining, by said first node, based on said received WUR beacons, time instances for transmitting data packets to said second node, and transmitting, by said second node, data packets at said determined time instances.

In a fourth aspect of the present disclosure, there is presented a method of calibrating a frequency of a receiver of a second node in a wireless mesh network, said second node comprising a primary receiver and a wake-up receiver, said method comprising the steps of periodically waking up a radio of said second node and transmitting Wake-Up Receiver, WUR, beacons to a first node, and calibrating, by said second node, said frequency of wake-up receiver based on said periodic transmission of said WUR beacons.

In an embodiment according to the fourth aspect, said second node is operating in a low power mode in between said periodic transmissions of said WUR beacons.

According to an exemplary embodiment, said WUR beacons are any of: advertising packets, and/or data messages published periodically by said second node.

According to an embodiment a time interval between said periodic transmissions depends at least in part on a time drift rate of the second node and/or on how much a frequency of the wake-up receiver of the second radio node is allowed to drift between successive wake-up receiver beacons.

In a fifth aspect of the present disclosure, there is presented a first node in a wireless mesh network wherein said first node comprises a primary radio receiver and a wake up receiver, and comprising a Radio Frequency, RF, switch, arranged to connect one of said primary or secondary radios to a radio antenna, said first node further comprising transmit equipment arranged for transmitting, to a wake-up receiver of a second radio node, a wake-up signal that indicates a frequency channel on which the second radio node is to transmit a response, receive equipment arranged for receiving, in response to transmitting said wake-up signal, response from said second radio node on the frequency channel indicated, and establish equipment arranged for establishing, a connection between said first and second nodes in order to transfer data between said first and second nodes.

According to an embodiment, said first node is a low power node and has an established friendship relation with said second node in said wireless mesh network.

According to an exemplary embodiment, said node further comprises determine equipment arranged for determining, that there is an uncertainty concerning the frequency at which said wake-up receiver of said second node receives said wake-up packets, select equipment arranged for selecting a suitable bandwidth for transmitting said wake-up packet based on said determined uncertainty, and said transmit equipment being further arranged for transmitting, said wake-up packet at said selected bandwidth.

According to an example, said receive equipment is further arranged for receiving, Wake-up receiver, WUR, beacons from said second node, said determine equipment is further arranged for determining based on said received WUR beacons, time instances for transmitting data packets to said second node, and said transmit equipment is further arranged for transmitting data packets at said determined time instances.

In a sixth aspect of the present disclosure, there is presented a computer-readable storage medium comprising a computer program, which when executed on at least one processor, cause the at least one processor to carry out a method in accordance with any of the embodiments presented herein.

DETAILED DESCRIPTION

Figure 1:
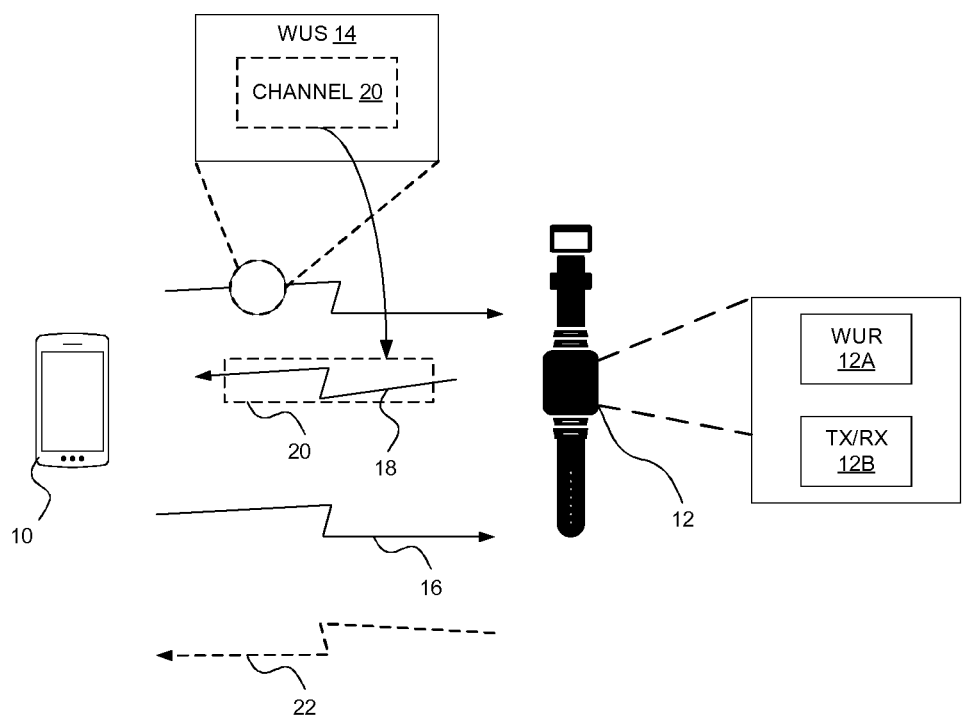
FIG. 1 shows two radio nodes forming part of a wireless mesh network according to the present disclosure.

FIG. 1 shows a first radio node 10 (e.g., a mobile phone) and a second radio node 12 (e.g., a smart watch) according to some embodiments. In some embodiments, the second radio node 12 has a wake-up receiver, WUR, 12A as well as one or more other transmitters, TX, and/or receivers, RX, 12B (also referred to as a main radio or main transceiver). The WUR 12A may be particularly designed and/or dedicated for receiving a wake-up signal, WUS, 14 which may also be referred to as a wake-up packet, WUP. The WUR 12A may for instance comprise a correlator configured to compare a received signal with an a priori known sequence. The WUR 12A however in some cases may also provide synchronization functionality (e.g., via detecting synchronization sequences). The WUR 12A in general therefore may be a receiver particularly designed and/or dedicated to detecting one or more predefined sequences such as a wake-up signal sequence and possibly one or more synchronization sequences. For this and other reasons, the WUR 12A may have a lower requirement on analog and radio frequency, RF, circuitry, and thereby the power consumption for the WUR may be significantly lower than for the one or more other transmitters/receiver 12B.

Equipped with the WUR 12A, the second radio node 12 can partially or fully de-activate the one or more other transmitters or receivers 12B while the WUR 12A monitors for the WUS 14. With the other transmitter(s)/receiver(s) 12B de-activated, the second radio node 12 may be said to operate in a sleep mode, i.e., a state that consumes less power. The WUS 14 may be a physical signal that indicates the second radio node 12 needs to wake up from the sleep state. The WUS 14 may for instance be a relatively short signal formed from an a priori known sequence that is detectable with a simple correlator. Regardless, when the WUR 12A detects the WUS 14, the second radio node 12 may activate the other transmitter(s)/receiver(s) 12B so as to exit the sleep mode or state.

According to some embodiments, the WUS 14 explicitly or implicitly indicates that data 16 is to be sent from the first radio node 10 to the second radio node 12. The second radio node 12 in such embodiments may therefore respond to the WUS 14 by not only waking up one or more radios/transmitters/receivers 12B of the second radio node 12, but also by transmitting a response 18 to the first radio node 10. The response 18 may be or comprise a request for initiating a connection between the radio nodes 10, 12, e.g., in the form of a connectable BLE advertisement on one or more BLE advertisement channels. Responsive to receiving the response 18, the first radio node 10 may transmit the data 16 to the second radio node 12, e.g., over the connection requested. These and other embodiments may therefore advantageously exploit the WUS 14 to avoid the second radio node 12 from having to poll the first radio node 10 for whether there is data 16 to be sent to the second radio node 12.

Alternatively or additionally, in some embodiments, the WUS 14 indicates a frequency channel 20 on which the second radio node 12 is to transmit the response 18. The frequency channel 20 may for instance be one of multiple advertising channels (e.g., BLE advertising channels) on which the response 18 is transmittable. Alternatively, the frequency channel 20 may be the same frequency channel on which the WUS 14 was transmitted. These and other embodiments may therefore exploit the WUS 14 for proactive agreement between the first and second radio nodes 10, 12 on which frequency channel 20 the response 18 is to be sent. This way, the second radio node 12 may transmit the response 18 on only the indicated frequency channel, rather than on each of multiple channels on which the response 18 could have been sent. In some embodiments, the second radio node 12 transmits the response 18 over the same time period as it would have transmitted the response over those multiple channels, so as to improve the robustness and detectability of the response 18.

Alternatively or additionally, in some embodiments, the first radio node 10 transmits the WUS 14 over a wider transmission frequency bandwidth than, e.g., a nominal frequency bandwidth of the WUS 14. The transmission frequency bandwidth may for instance be wider than a reception frequency bandwidth over which the WUS 14 is to be received by the second radio node 12 and/or wider than a frequency bandwidth of a channel selective filter used by the second radio node 12. In these and other embodiments, the wider transmission frequency bandwidth may account for uncertainty in a centre frequency at which the WUS 14 is to be received by the second radio node 12. This allows for relaxed requirements on the frequency generation in WUR 12A of the second radio node 12.

In any event, in some embodiments, the first radio node 10 transmits the WUS 14 over the wider transmission frequency bandwidth by transmitting the WUS 14 as a single "wideband" signal that spans the transmission frequency bandwidth. In other embodiments, the first radio node 10 transmits the WUS over the wider transmission frequency bandwidth by transmitting the WUS 14 as multiple narrowband signals in different respective portions of the transmission frequency bandwidth.

In some embodiments, uncertainty exists in the centre frequency at which the WUS 14 will be received at least in part due to relaxed requirements placed on the second radio node 12. In these and other embodiments, the second radio node 12 may periodically wake up its radio 12B and transmit from the radio 12B wake-up receiver beacons 22 to the first radio node 10. The beacons 22 may be advertising packets, data messages published periodically by the second radio node 12, encapsulate application data messages. Regardless, based on periodic transmission of these beacons 22, the second radio node 12 may calibrate the frequency of the WUR 12A due to that the frequency accuracy of the radio 12B is better than that of the radio 12A. In between beacon transmissions, though, the second radio node 12 may perform frequency generation at a relatively low accuracy. For example, in some embodiments, the second radio node 12 may perform frequency generation in between periodic transmissions of the wake-up receiver beacons 22 using a free-running oscillator.

Figure 2:
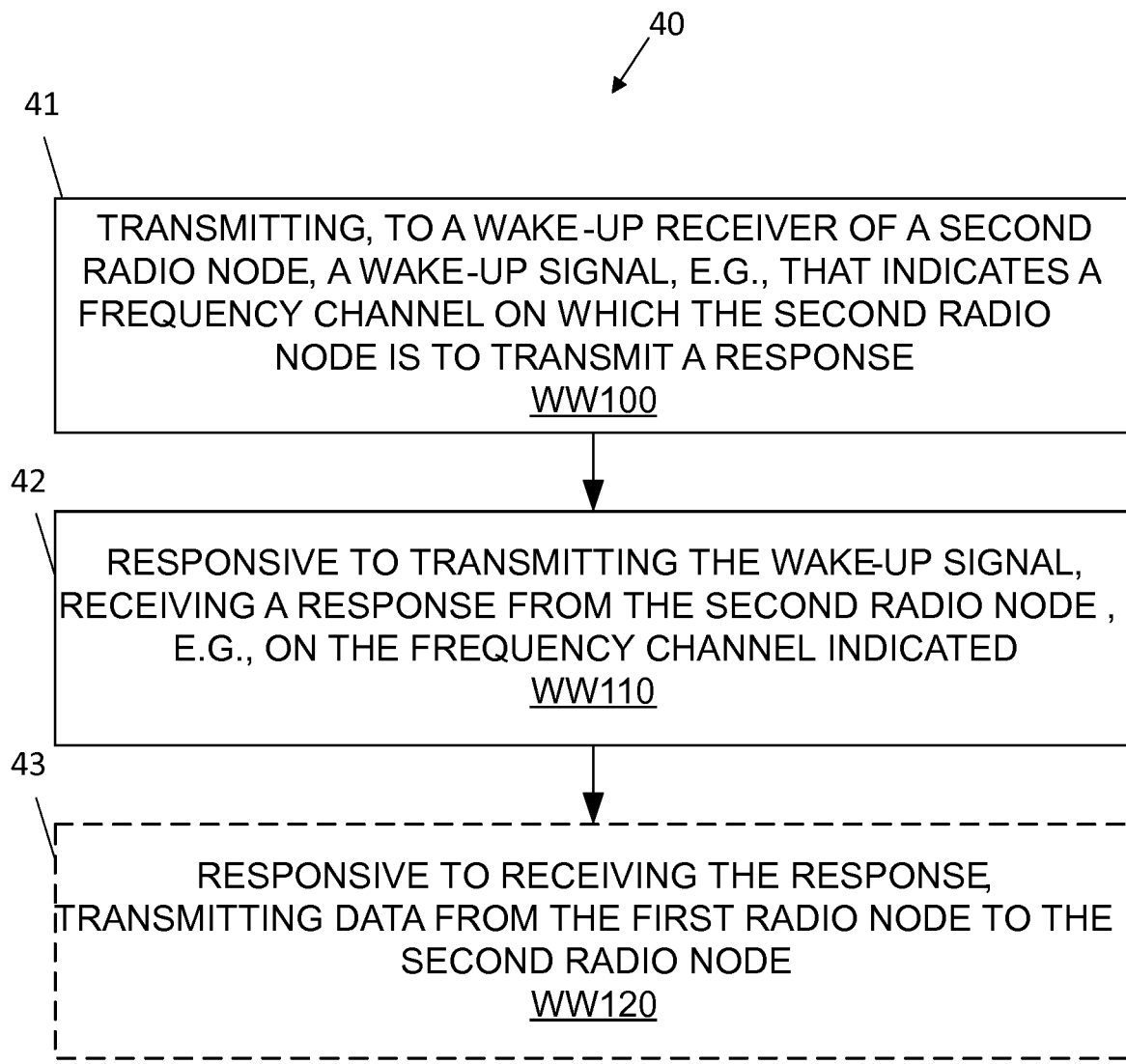
FIGS. 2-8 schematically illustrate methods according to the present disclosure.
Figure 3:
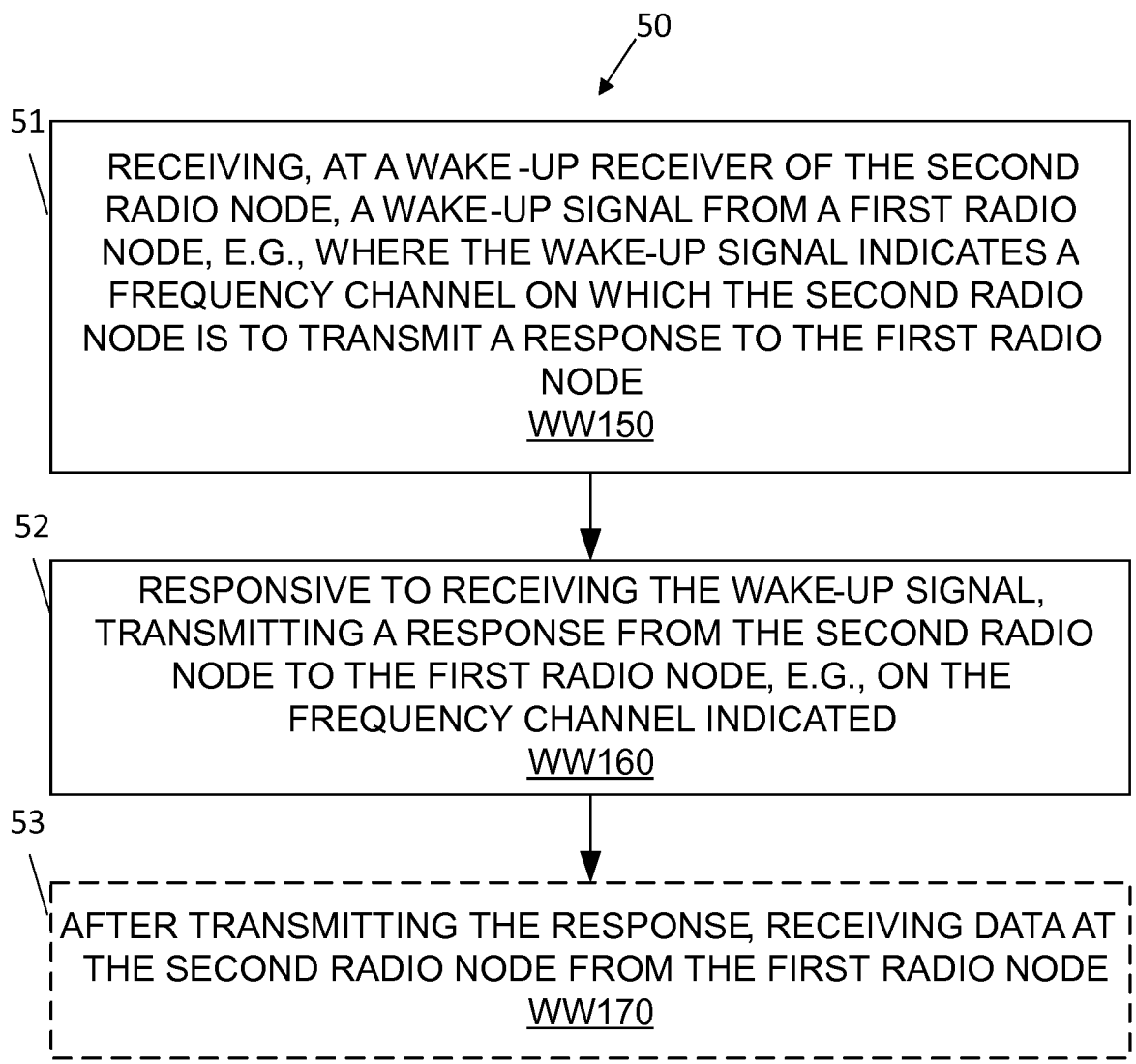

In view of the above modifications and variations, FIG. 2 depicts a method performed by a first radio node in accordance with particular embodiments. FIG. 3 depicts a method performed by a second radio node in accordance with other particular embodiments.

Figure 4:
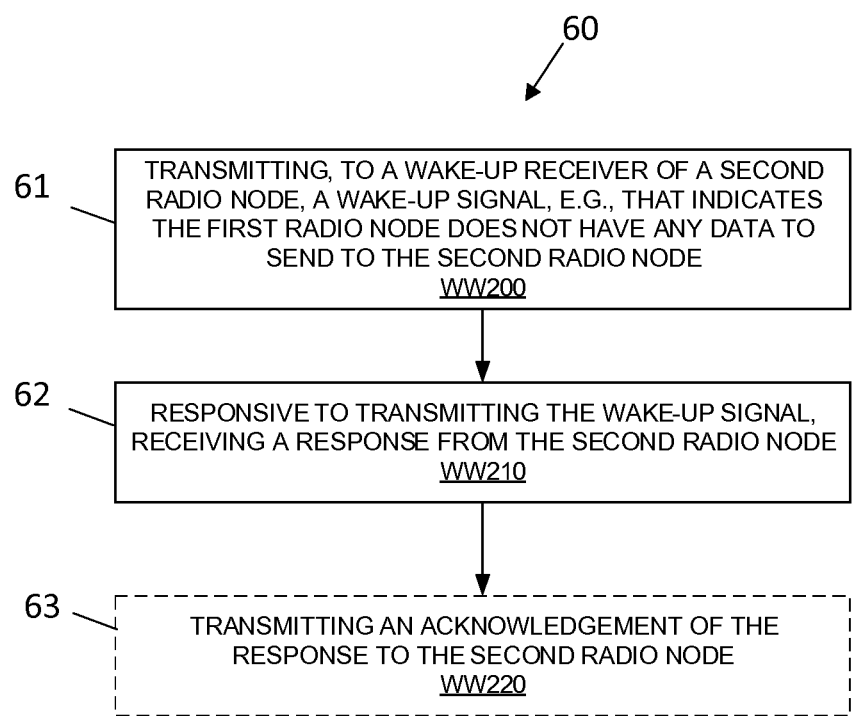
Figure 5:
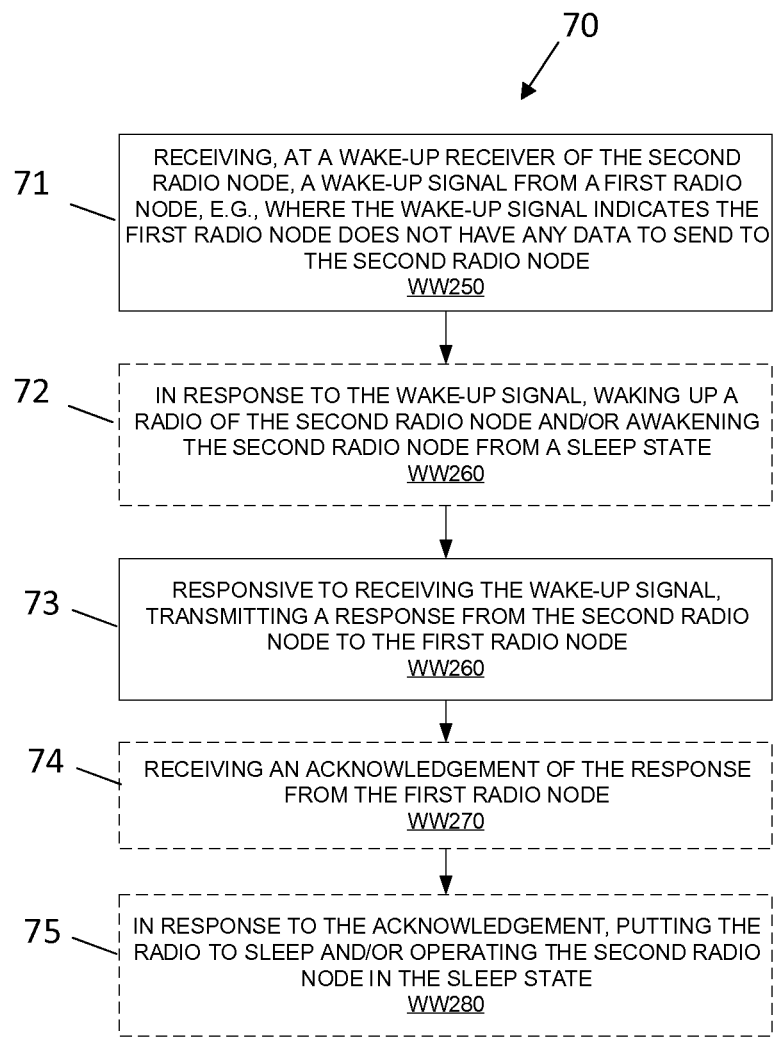

FIG. 4 depicts a method performed by a first radio node in accordance with particular embodiments. FIG. 5 depicts a method performed by a second radio node in accordance with other particular embodiments.

Figure 6:
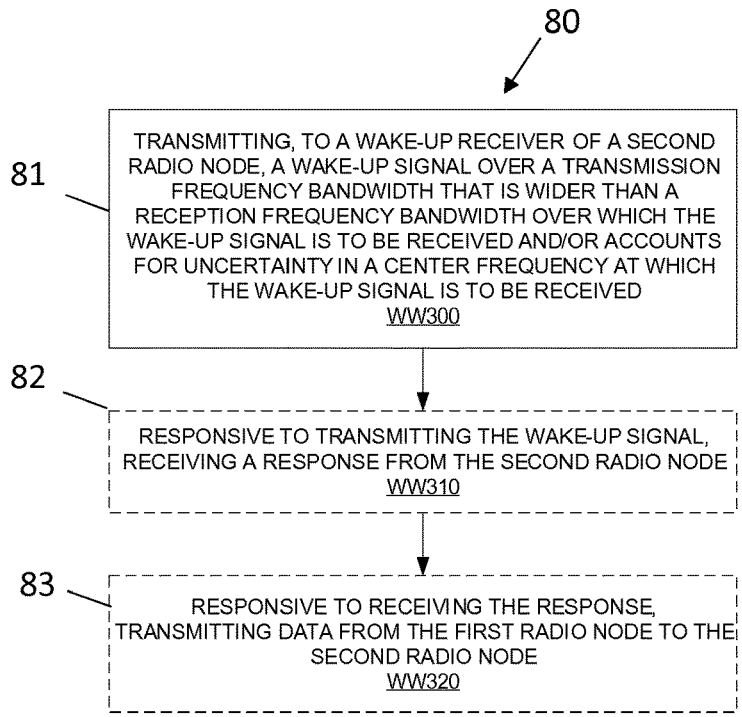

FIG. 6 depicts a method performed by a first radio node in accordance with particular embodiments.

Figure 7:
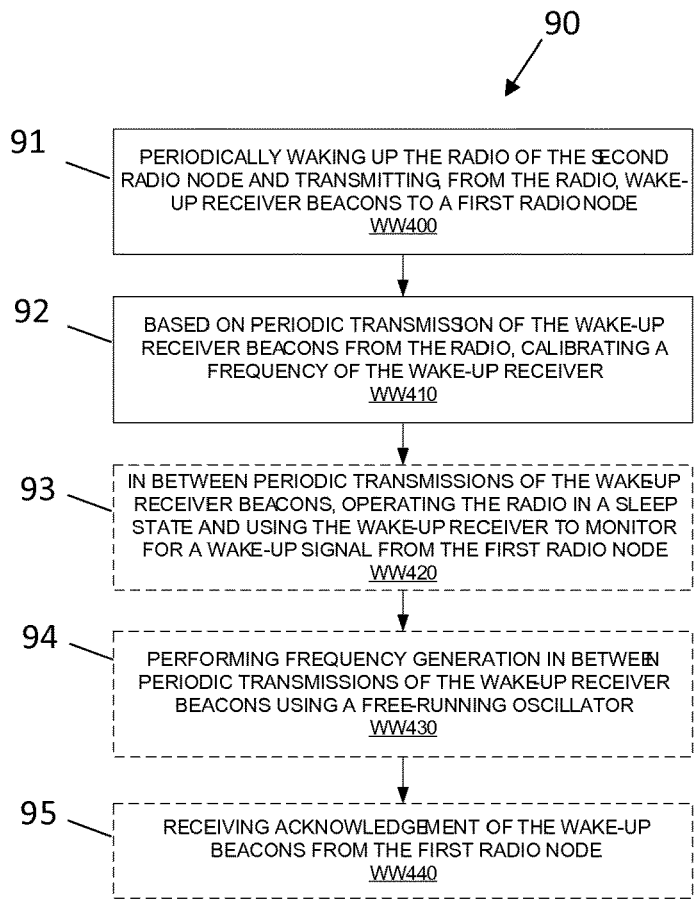
Figure 8:
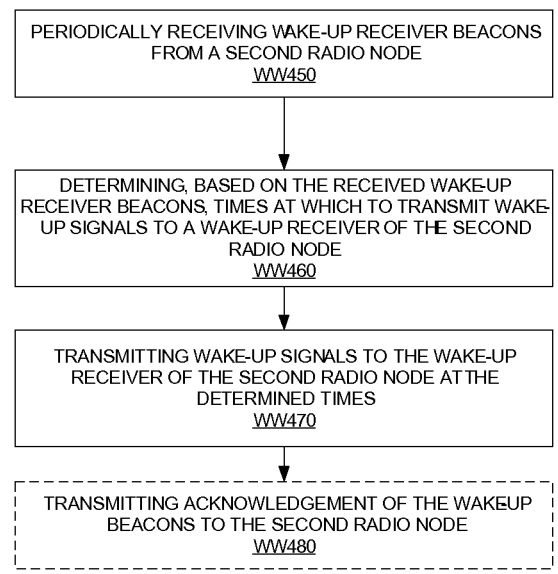

FIG. 7 depicts a method performed by a second radio node in accordance with particular embodiments. FIG. 8 depicts a method performed by a first radio node in accordance with other particular embodiments.

Note that any of the embodiments above may be implemented separately or in combination.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory, ROM, random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
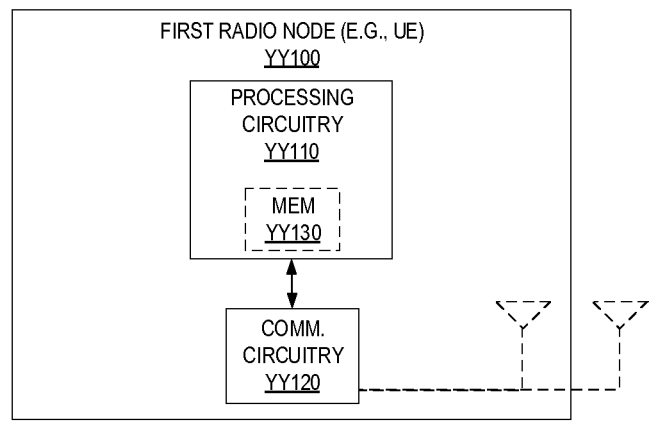
FIG. 9 illustrates a first radio node according to the present disclosure.

FIG. 9 for example illustrates a first radio node YY100 as implemented in accordance with one or more embodiments. As shown, the first radio node YY100 includes processing circuitry YY110 and communication circuitry YY120. The communication circuitry YY120 (e.g., radio circuitry) is configured to transmit and/or receive information to and/or from one or more other nodes, e.g., via any communication technology. Such communication may occur via one or more antennas that are either internal or external to the first radio node YY100. The processing circuitry YY110 is configured to perform processing described above, such as by executing instructions stored in memory YY130. The processing circuitry YY110 in this regard may implement certain functional means, units, or modules.

Figure 10:
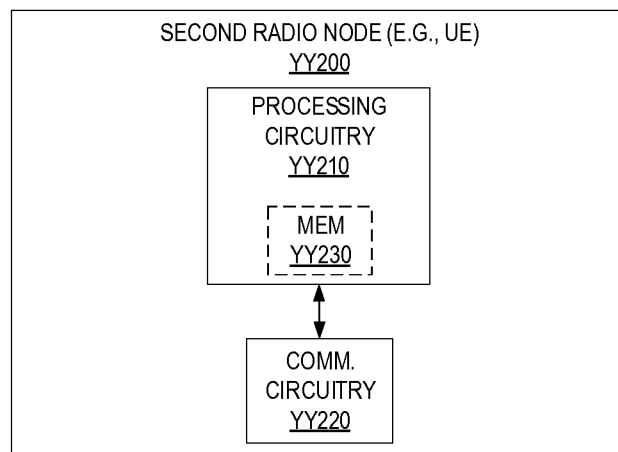
FIG. 10 illustrates a second radio node according to the present disclosure.

FIG. 10 illustrates a second radio node YY200 as implemented in accordance with one or more embodiments. As shown, the second radio node YY200 includes processing circuitry YY210 and communication circuitry YY220. The communication circuitry YY220 is configured to transmit and/or receive information to and/or from one or more other nodes, e.g., via any communication technology. The processing circuitry YY210 is configured to perform processing described above, such as by executing instructions stored in memory YY230. The processing circuitry YY210 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above. Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Internet of Things, IoT, is expected to increase the number of connected devices significantly. A vast majority of these devices will likely operate in unlicensed bands, in particular the 2.4 GHz ISM band. At the same time, there is also increased demand for using the unlicensed bands also for services that traditionally have been supported in licensed bands. As an example of the latter, third generation partnership project, 3GPP, that traditionally develop specifications only for licensed bands have now also developed versions of Long Term Evolution, LTE, which will operate in the 5 GHz unlicensed band.

A large number of these IoT devices are expected to be powered by coin-cell batteries, which means that energy consumption is of outmost importance. In the future, it may even be so that these devices will be able to harvest their energy themselves, potentially even further increasing the importance of low energy consumption.

For these kind of applications, the supported data rates are low, both concerning peak data rates and aggregated data rate during, say, an average day. This means that a major part of the power is not consumed when the IoT device is transmitting or receiving data, but rather when the devices are listening to determine whether there might be a transmission for which it is the intended receiver.

The fact that such a large part of the total energy consumption is due to listening for a potential transmission, just to find out that the transmission is not there, has motived the development of so-called wake-up receivers, WUR. A WUR is a device which has extremely low power consumption and whose only purpose is to wake up the main radio(s)/transmitter(s)/receiver(s). So, an IoT device with a WUR will not need to turn on the main receiver(s) to scan for a potential packet, but will instead turn on the WUR. If in fact there is data for the IoT device, a wake-up signal/signature, WUS, will be sent to the WUR. When the WUR has decoded this WUS and determined that there in fact is data present it will then wake up the main receiver and transmitter, and a communication link can be established.

An alternative approach for achieving low energy consumption is taken in Bluetooth Low Energy, BLE, standard. In BLE, the energy constrained device (also referred to as a low power node/device) is not listening, but instead transmitting or polling another device to determine whether there is any data that the energy constrained device needs to receive. The rational for this is that a poll packet may be as short as 400 µs, which together with a listening time of around 20 ms, allows the device to be in sleep for most of the time even if a poll packet is sent once every second.

Taken alone, the approach in BLE is better suited if the low power, LP, device is the transmitter rather than the receive for the data, since in this case the initial packet, known as an advertising packet, can have the purpose of initializing a link for data communication since in this case it is known that data is available for transmission. When the advertising packet instead effectively is a polling packet, the efficiency of the protocol will depend on how often the polling actually results in that a data packet will be transmitted.

There currently exist certain challenge(s). The efficiency of polling for data will depend on how often there is data available. For many IoT applications, a small amount of data is sent at relatively rare occasions, say only once or twice every day. If the acceptable delay is on the order of one second, this means that a polling packet needs to be sent every second and therefore more than 86000 polling packets will be sent every 24 hours although only two data transmission will be initiated. Even if the power consumption for the device sending the polling packets can be made low, the other party of the link must still have its receiver on all the time in order for the protocol to work as intended. Thus, it is assumed that one of the devices engaged in the communication link is not energy-limited.

A second problem with a protocol based on polling is the poor usage of the wireless medium, since almost all transmissions do not result in that any user data is transmitted. For BLE, where the advertising channels already today are quite congested, this means that scarce resources are used very inefficiently thereby potentially impacting legacy systems negatively.

A third problem with a protocol based on polling is that it does not scale well in the sense that if a large number of low intensity IoT devices are to be supported, each one of these devices would need to perform the polling. This not only has the drawback that the wireless channel gets severely congested, it also implies that the reliability of the polling packets degrades.

Finally, and perhaps the largest problem with a protocol based on polling, is that the protocol assumes that the listening device is actually listening. Taking a specific example, suppose that the BLE protocol is used and the advertiser is a door lock, whereas the scanning device is a mobile phone. The use case would correspond to a person coming home, and when the phone is within range it should allow for using the phone to open the door. Now, BLE is used for numerous applications e.g. for synchronizing smart watches. If such a synchronization would be going on at the same time as the door lock is sending advertising packets, there is an obvious risk that the advertising packet will not be correctly received. If, on the other hand, the mobile phone would initiate the transmission to the door lock, once the app in the mobile phone for opening the door lock is started the mobile phone would easily be able to schedule this to happen in a time-multiplexed fashion while still synchronizing with the smart watch.

Certain aspects of the present disclosure and their embodiments may provide solutions to these or other challenges. Some embodiments allow for efficient use of a wake-up radio, WUR, in BLE, e.g., still leveraging on some of the desirable features of the BLE protocol.

In some embodiments, when data is available for a low power device, a wake-up packet, WUP, is sent to the WUR, avoiding the need for polling. Once the low power device is woken up, it may use a BLE procedure for initializing a connection, i.e., it sends an advertising packet. In this case, however, since it is woken up by a WUP, it is known that data is available so that in the absence of errors user data will be transmitted. In addition, when waking up the low power device, the WUP may optionally include information about on what channel the transmitter of the WUP will be listening for the advertising packet, avoiding the need to send the advertising packet on three different channels and thereby further enhancing the connection establishment.

Another option in some embodiments is to indicate in the WUP that there is no data to send. Still, this option could be used as a "keep-alive" message to check if it is possible to contact the low power device. This can be useful in scenarios where traffic exchange happens very rarely. When the WUR receives such packet, it can send back an advertisement and, after receiving an acknowledgement, then go back to sleep immediately.

Alternatively or additionally in some embodiments, the low power device at regular intervals turns on the main radio and transmits a WUR beacon. The purpose for this is twofold.

First, by turning on the main radio the frequency of WUR can be calibrated. This regular calibration allows the WUR to use a very relaxed frequency generation which can be allowed to drift in between the calibration events. Since accurate frequency generation is one of the main sources for power consumption in a receiver, this has a significant impact on the overall energy consumption of the low power device.

Second, by transmitting the WUR beacon, the scanning device can upon reception of the WUR beacon determine how much the low power device has drifted and this is used so that the transmitter of the WUP knows when the low power device has its WUR on. It is here assumed that although the WUR is low power, it is still believed to be advantageous to run the WUR in a duty-cycled mode to get an even lower power consumption.

In still other embodiments, the WUR beacon is explicitly acknowledged. By acknowledging the WUR beacon, the low power node knows that it can still reach the scanning device. This is in contrast to a protocol where an advertising packet is sent and the absence of a response is interpreted as an implicit acknowledgement of that there is no data available.

Certain embodiments may provide one or more of the following technical advantage(s). Some embodiments allow for adding support of WUR to BLE, e.g., in a way that allows a very relaxed WUR architecture to significantly reduce the power consumption.

Some embodiments are based on complementing the BLE protocol such that the strengths of BLE are still used, but without the drawbacks that would come with using BLE for many relevant IoT applications. Specifically, one advantage is that the spectrum is used in a much more efficient way as the need for polling is avoided.

Other embodiments advantageously introduce explicit ACKs for receptions, thereby ensuring a significant improvement when it comes to reliability of the system.

Some embodiments will now be presented when being applied to BLE, and the terminology used in BLE will be adopted. As is clear for anyone of ordinary skill in the art, the embodiments are by no means restricted to BLE. Instead, BLE is merely used as an example to ease the description of the various features of some embodiments.

Moreover, some embodiments will be described for a scenario which consists of one Lower Power, LP, node and one Friend node. The Friend node is here assumed to occasionally have data to send to the LP node for example, as cached at the Friend node on behalf of the LP node, and the goal is to send this data to the LP node in a way that minimize the required average power consumption without introducing an unacceptable delay.

Consider first additional information about BLE. In BLE, a LP node should perform advertising (polling) to initialize a connection with a central device in case there is data to send in any of the two directions—it advertises to announce that it can accept connection attempts. Bluetooth Mesh defines also a polling mechanism between a LP node and a Friend node, where data is transmitted in a connectionless fashion. In case the LP node is the source of the data, the LP node will send an advertising packet to the Friend node. Assuming the Friend node is performing scanning and is correctly receiving the advertising packet, it may initiate a connection with the advertiser. In order to prepare for a potential response from the Friend node, the advertiser switches to receive mode after having sent the advertising packet. The advertising packet heretofore is a short packet which is sent successively on three different frequency channels, since it is not known which one of the three channels the Friend node will be scanning on.

Although the transmission of the advertising packet is very short and therefore can be done using very little energy, the corresponding reception, i.e., when the LP mode switches to receive mode and listens for a potential message from the Friend, must typically be done for around 20 ms due to the uncertainly of when the advertising packet may be sent. If the LP node sends a connectable advertising, a connection request is immediately received from the Friend. However, the receiver of the LP nodes needs to be on for the duration of a transmitWindowSize window (from 1.25 ms to 10 ms) before receiving the first message (connection event) and wake up periodically to receive connection events from the Friend.

It is clear from the discussion above that the burden in terms of power consumption is put on the Friend node, which is essentially expected to be scanning for advertising packets continuously in order to ensure that the transmission of an advertising packet actually results in a connection request.

When the LP node has data to send, this approach is very effective since in this case an advertising packet will only be sent when data is available for transmission. However, when the data is going in the other direction, i.e., from the Friend node to the LP node, the advertising packet from the LP node will act as a poll packet, and a connection will only be initiated when the Friend node actually has data for the LP node. When there is no data, the Friend node may simply ignore the advertising packet and not send any response.

The problem with this approach is twofold. First, if the packet rate from the Friend node to the LP node is very low at the same time that there is a relatively high delay requirement, there will be a high rate of advertising packets sent and the vast majority of these will not result in that any data will be sent over the channel as there simply is no data available at the Friend node.

Second, unless a connection is established to verify that in fact there is no data available at the Friend node, there is a relatively high probability that no connection request is sent from the Friend node because the advertising packet was not correctly received. That is, the reliability of an advertising packet is relatively low. In case the transmission of the packet from the Friend node to the LP node is not time critical, this is typically not an issue since the LP node will send advertising packets regularly, and thus if one or a few advertising events are not successful this may still be acceptable.

Consider next additional information about WUR. Usage of a WUR if directly applied to a situation with a Friend node and a LP node would be as follows. The LP node would be equipped with a WUR and when a packet was available for the LP node, the Friend node would send a WUP to the LP node, which would then wake up the main radio of the LP node and send a Friend Poll or initiate a connection with the Friend node.

If the WUR would have sufficiently low power consumption it could be on all the time, and the transmission of a WUP could then be done as soon as there would be a packet for the LP node available at the Friend node. Often, however, it is desirable to decrease the average power consumption of the WUR even further. If this is the case, the WUR is therefore typically duty-cycled so that e.g. is ON for 2 ms every 100 ms, essentially reducing the power consumption another 50× if the power consumption in the OFF state can be ignored in comparison to the power consumption in the ON state, see FIG. 11. The parameters of the duty-cycle are negotiated using the main radios before the LP node switches off the main radio and instead rely on the WUR in case the Friend node wants to connect.

Figure 12:
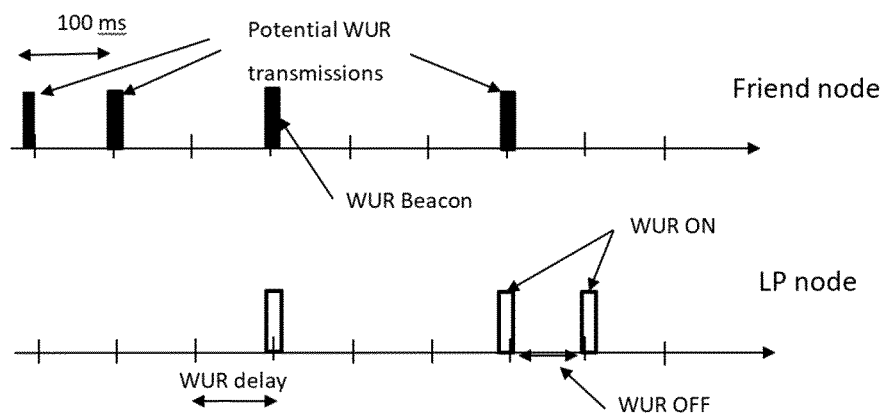
FIG. 12 illustrates a timing diagram according to an embodiment of the present disclosure.

When a duty-cycled WUR is used, the transmitter of the Friend node will wait until it knows that the WUR is ON before transmitting the WUP, and it is the responsibility of the WUR to ensure that it stays synchronized to the agreed duty-cycle pattern. Specifically, since the WUR is in a low power mode it will drift over time and must thus occasionally re-synchronize to the Friend node. This re-synchronization is may be achieved by having the Friend node to send out WUR beacons at predetermined intervals, say every 10 s, see FIG. 12. The WUR will receive these WUR beacons and will use these to ensure that it remains in sync with the Friend node.

When a WUP packet is received by the WUR, it may just wake up the main radio and use the advertising process according to BLE. It is believed, however, that there are more efficient ways to introduce support for WUR in BLE. Different means to do this will be described in the following sections.

Introducing Support for WUR in BLE—Embodiment 1

One way to introduce WUR is that, once the WUP is received, just operate according to the BLE protocol. Using this protocol, the advertising packet is sent on three different frequency channels, centred at 2402 MHz, 2426 MHz, and 2480 MHz, respectively. The reason for this is that the advertiser does not know which one of these channels the scanning device (the Friend node) is listening to.

According to the present embodiment, the WUP contains information about which one of the three frequency channels the Friend node is currently using for scanning. In this way, the advertising can be done on the correct channel directly and in this way one may gain in connection set-up time or in robustness, since the advertising packet may be made longer without increasing the total time needed for the advertising.

Introducing Support for WUR in BLE—Embodiment 2

As known to the person skilled in the art, the main part of the power consumption for the Low Power mode in case of the advertising event is not the transmission of the advertising packet, but rather when the LP node is in the receive mode listening for a response.

The WUR in this case either uses the same frequency channel as would have been used if the BLE advertising protocol would have been used, i.e., the frequency channel would be one of the three advertising channels mentioned above. Alternatively, since the advertising channels may be rather congested, the WUR may use the same channel as was used for the original WUP.

Introducing Support for WUR in BLE—Embodiment 3

A major part of the energy consumption in a WUR is caused by the blocks used for frequency generation. The need for accurate frequency generation in the WUR may be avoided by not having a selectivity filter in the receiver and completely ignore the need for filtering out interference at adjacent channels. In a practical implementation, and in particular when the WUR is intended to operate in the unlicensed 2.4 GHz ISM band, efficient attenuation of adjacent interference may be required or at least highly desirable.

Figure 11:
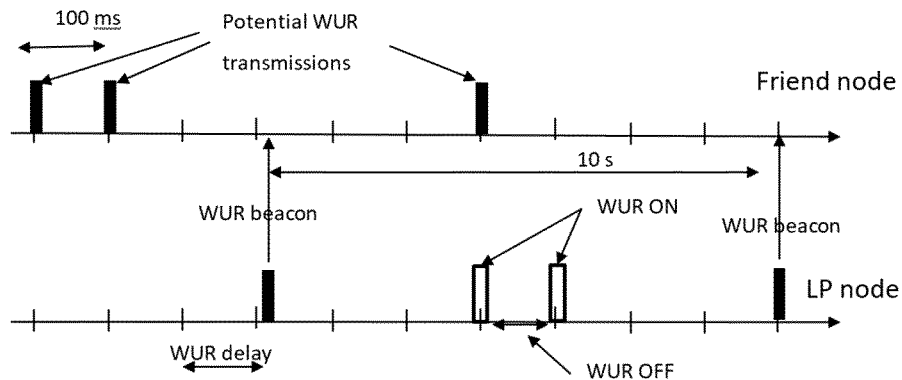
FIG. 11 illustrates a timing diagram according to an embodiment of the present disclosure.

To allow for very relaxed requirement on frequency generation the following approach is disclosed, with reference to FIG. 11. The main radio of the LP node is woken up at regular intervals to transmit a WUR beacon to the Friend node, i.e., opposite to known approaches where the WUR beacon is sent by the Friend node, it is in this embodiment the LP node that sends the WUR beacon. Once the main radio of the LP node is woken up, the frequency of the WUR will also be calibrated to that it is as intended. However, once the transmission of the WUR beacon is done, the main radio is turned off and the WUR will rely on very relaxed frequency generation. Therefore, the centre frequency used by the WUR may drift from the nominal frequency. How much the frequency may drift can be estimated based on the accuracy of the frequency generation and the duration between the WUR beacons, where the WUR is once again re-calibrated.

The WUR beacon may also be used by the Friend node to estimate the time drift of the LP node, so that rather than having the LP node to adjust its timing for reception, the Friend node will adjust its timing for transmission. The purpose is essentially to move as much complexity as possible from the LP node to the Friend node. In a special case of this embodiment, the WUR beacon can be aligned with a periodic data transmission from the LP node. In the case of Bluetooth Mesh, the WUR beacon interval can be aligned with the Publish Period state accessible in the Foundation Model of the node. Application data messages can be sent as a payload of the WUR beacons. In this way, there is no overhead required for WUR beacon transmission considering the regular message publishing from the LP node.

Although the WUR beacon in principal may be a newly defined packet type, with the mere purpose of aiding the Friend node to estimate the timing, it may also be an ordinary advertising packet.

Figure 13:
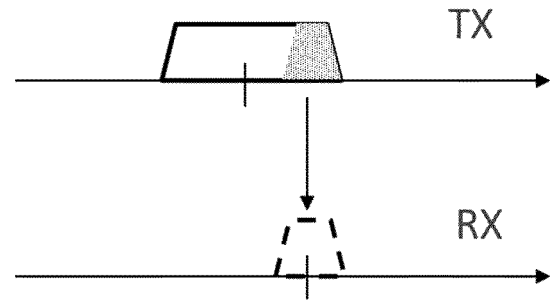
FIG. 13 illustrates a bandwidth for sending wakeup packets according to the present disclosure.

Now, since the frequency of the WUR in the LP node may drift, the Friend node according to some embodiments takes this into account when transmitting the WUP. One way to do this is illustrated in FIG. 13 where the transmitter is transmitting over an increased bandwidth to take into account for drift of the WUR. More particularly, the transmitter knows how much the WUR may be off compared to the nominal frequency and therefore transmits a signal that is correspondingly wider.

As an example, suppose the bandwidth of the WUP is 1 MHz, that the WUR also uses a channel selective filter, CSF, with 1 MHz BW, and that the frequency of the WUR may drift 2 MHz. To ensure that a signal carrying the WUP will fall in the passband of the CSF, the Friend node will transmit the WUP over in total 5 MHz. One alternative to achieve this is to transmit a signal that is 5 MHz wide instead of 1 MHz, accepting that 4 MHz of the transmitted signal will be remove by the CSF in the WUR. Alternatively, the WUR packet may be sent on a 5 MHz channel, but at a centre frequency that is stepped through the total 5 MHz bandwidth. So, as an example, the WUP may be sent 5 times so that a total of 5 MHz is covered by sending the 1 MHz signal 5 times.

Whether it is preferable to send a wideband signal directly or transmitting a narrow band signal that is stepped through the total bandwidth that should be covered may depend on whether there the transmitted power is limited by the power of the signal as such or by the power spectrum density (PSD) of the signal. In the former case, i.e., it may be preferable to send a more narrow signal a few times in order to ensure that the received signal quality is as high as possible once the used TX frequency aligns with the RX frequency. However, if the output power is limited by the PSD and the transmitter is able to transmit at the highest allowed PSD over the full bandwidth, it is preferable to so this as the signal then will be in the pass band of the CSF without any need to change the carrier frequency of the transmitted signal.

In BLE the channels used for advertising are selected such that they will not coincide with the three Wi-Fi channel most commonly used in the 2.4 GHz band. This is an approach proposed also for the WUR channels. The three most commonly used Wi-Fi channels are Channels 1, 6, and 11, and are centred at 2412 MHz, 2437 MHz, and 2462 MHz, respectively. Assuming a bandwidth of 20 MHz for a Wi-Fi channel, this means that there is about 5 MHz available between 2422 and 2427 MHz, another 5 MHz between 2447 and 2552 MHz, and finally a bit more than 5 MHz available above 2472 MHz.

As a special case of this embodiment it is envisioned that the frequency drift of the WUR is limited so that no WUR beacon is needed, and where the frequency uncertainty of the WUR can be handled entirely by the transmitter side by transmitting a signal over a bandwidth that is larger than the bandwidth of the CSF in the receiver.

The bandwidth available in between Wi-Fi channels or above Wi-Fi channel 11 is thus around 5 MHz. Also covered by the present disclosure is a design where the allowed frequency drift is taken to be such that it when considered together with the bandwidth of the signal is sufficiently small to largely avoid expected interference and at the same time is made as large as possible.

A specific example of where this embodiment is applicable is therefore when a 1 MHz wide wake-up signal is used and where the allowed frequency drift is taken to be 2 MHz, so that it is known that the passband of the CSF of the WUR will not be interfered by the most commonly used Wi-Fi channels.

Some embodiments herein may generally be characterized as follows.

Embodiments include a method for initiating a connection, characterized by that a first device which has data to send, transmits a wake-up packet to a wake-up receiver in a second device, and where as in response to the reception of the wake-up message, the second device sends a request to initiate a connection using the first device. The message sent from the first device to the WUR may contain information about what frequency channel should be used by the second device when transmitting the request to initiating the connection. In some embodiments, the first device transmits a wake-up signal that has larger bandwidth than the bandwidth of the channel selective filter of the second device. Alternatively or additionally, the wake-up signal transmitted by the first device may be sent at least two times, and the carrier frequency used for the transmission of the at least two wake-up packets is changed an amount that is at most equal to the bandwidth of the transmitted wake-up signal. In some embodiments, the frequency of the wake-up signal is selected such that it to a large extent avoids interference from Wi-Fi channel 1, 6, and 11.

Other embodiments include a method for message transaction over mesh friendship, characterized by that a first device which has data to send, transmits a wake-up packet to a wake-up receiver in a second device, and where as in response to the reception of the wake-up message, the second device sends a friend poll message to the first device. The message sent from the first device to the WUR may contain information about what frequency channel should be used by the second device when transmitting the friend poll. In some embodiments, the frequency of the wake-up signal is selected such that it to a large extent avoids interference from Wi-Fi channel 1, 6, and 11.

Other embodiments include a method for transmitting wake-up packets from a first node to a second node, the second node having a wake-up radio. The method characterized of that the bandwidth used by the first node for transmitting the wake-up packet is selected based on that there is an uncertainly concerning the frequency used by the wake-up radio for receiving the signal. In some embodiments, the frequency of the wake-up signal is selected such that it to a large extent avoids interference from Wi-Fi channel 1, 6, and 11.

Other embodiments include a method for transmitting wake-up packets from a first node to a second node, the second node having a wake-up radio. The method characterized of that the second device occasionally sends WUR beacons to the first device and where the first device uses the WUR beacons to determine when to send wake-up packets to the second node. In some embodiments, a WUR beacon is a regular data message published periodically by the LP node. In some embodiments, the second device in between the transmission of the WUR beacons turns off the main transceiver and where the frequency generation then is done at much lower accuracy. For example, the frequency may be generated with a free-running oscillator. In some embodiments, the interval between the WUR beacons is determined at least in part on the expected time-drift rate of the second device. In some embodiments, the interval between the WUR beacons is at least in part based on how much the frequency of the WUR is allowed to drift during the interval between two WUR beacons. In some embodiments, the frequency of the wake-up signal is selected such that it to a large extent avoids interference from Wi-Fi channel 1, 6, and 11.

Embodiments will now be described in the context of a wireless network. In some embodiments, the first radio node and/or the second radio node may be a wireless device as discussed below.

Figure 14:
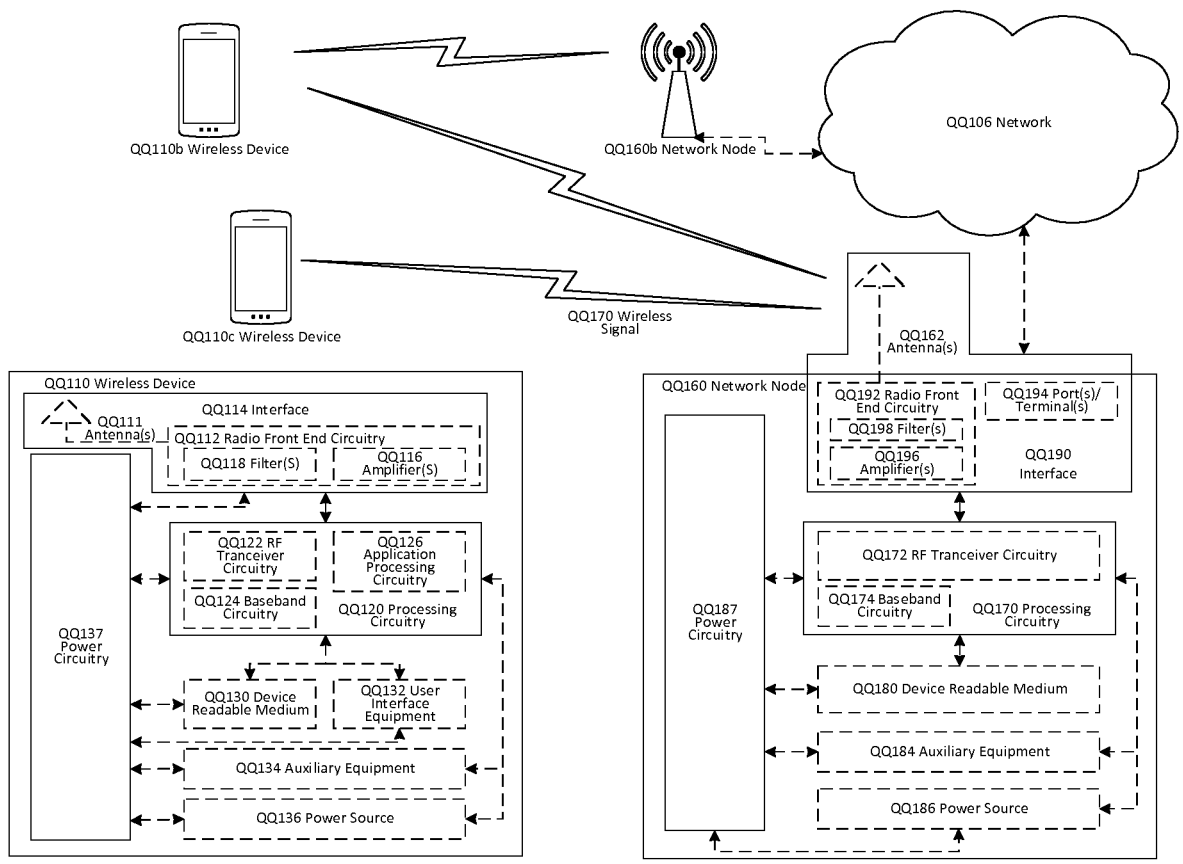
FIG. 14 illustrates a wireless mesh network according to the present disclosure.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device, WD, QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications, GSM, Universal Mobile Telecommunications System, UMTS, Long Term Evolution, LTE, Narrowband Internet of Things, NB-IoT, and/or other suitable 2G, 3G, 4G, or 5G standards; wireless local area network, WLAN, standards, such as the IEEE 802.11 standards; and/or any other appropriate wireless communication standard, such as the Worldwide Interoperability for Microwave Access, WiMAX, Bluetooth, Z-Wave and/or ZigBee standards.

Network QQ106 may comprise one or more backhaul networks, core networks, IP networks, public switched telephone networks, PSTNs, packet data networks, optical networks, wide-area networks, WANs, local area networks, LANs, wireless local area networks, WLANs, wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points, APs, (e.g., radio access points), base stations, BSs, (e.g., radio base stations, Node Bs, evolved Node Bs, eNBs, and NR NodeBs, gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units, RRUs, sometimes referred to as Remote Radio Heads, RRHs. Such remote radio units may or may not be integrated with an antenna as an antenna integrated radio. Parts of a distributed radio base station may also be referred to as nodes in a distributed antenna system, DAS. Yet further examples of network nodes include multi-standard radio, MSR, equipment such as MSR BSs, network controllers such as radio network controllers, RNCs, or base station controllers, BSCs, base transceiver stations, BTSs, transmission points, transmission nodes, multi-cell/multicast coordination entities, MCEs, core network nodes such as MSCs, MMEs, O&M nodes, OSS nodes, SON nodes, positioning nodes such as E-SMLCs, and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, Wi-Fi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip, SOC.

In some embodiments, processing circuitry QQ170 may include one or more of radio frequency, RF, transceiver circuitry QQ172 and baseband processing circuitry QQ174. In some embodiments, radio frequency, RF, transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory, RAM, read-only memory, ROM, mass storage media, for example, a hard disk, removable storage media, such as a flash drive, a Compact Disk, CD, or a Digital Video Disk, DVD, and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, a radio node is any type of node capable, configured, arranged, and/or operable to communicate wirelessly via radio frequency communications. A radio node may be a wireless device, WD, as used herein. A radio node may alternatively be a radio network node as used herein.

As used herein, wireless device, WD, refers to a device capable, configured, arranged and/or operable to communicate wirelessly with network nodes and/or other wireless devices. Unless otherwise noted, the term WD may be used interchangeably herein with user equipment, UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP, VoIP phone, a wireless local loop phone, a desktop computer, a personal digital assistant, PDA, a wireless cameras, a gaming console or device, a music storage device, a playback appliance, a wearable terminal device, a wireless endpoint, a mobile station, a tablet, a laptop, a laptop-embedded equipment, LEE, a laptop-mounted equipment, LME, a smart device, a wireless customer-premise equipment, CPE. A vehicle-mounted wireless terminal device, etc. A WD may support device-to-device, D2D, communication, for example by implementing a 3GPP standard for side link communication, vehicle-to-vehicle, V2V, vehicle-to-infrastructure, V2I, vehicle-to-everything, V2X, and may in this case be referred to as a D2D communication device. As yet another specific example, in an Internet of Things, IoT, scenario, a WD may represent a machine or other device that performs monitoring and/or measurements, and transmits the results of such monitoring and/or measurements to another WD and/or a network node. The WD may in this case be a machine-to-machine, M2M, device, which may in a 3GPP context be referred to as an MTC device. As one particular example, the WD may be a UE implementing the 3GPP narrow band internet of things, NB-IoT, standard. Particular examples of such machines or devices are sensors, metering devices such as power meters, industrial machinery, or home or personal appliances (e.g. refrigerators, televisions, etc.) personal wearables such as watches, fitness trackers, etc. In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory, RAM, or Read Only Memory, ROM), mass storage media such as a hard disk, removable storage media, for example a Compact Disk, CD, or a Digital Video Disk, DVD), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
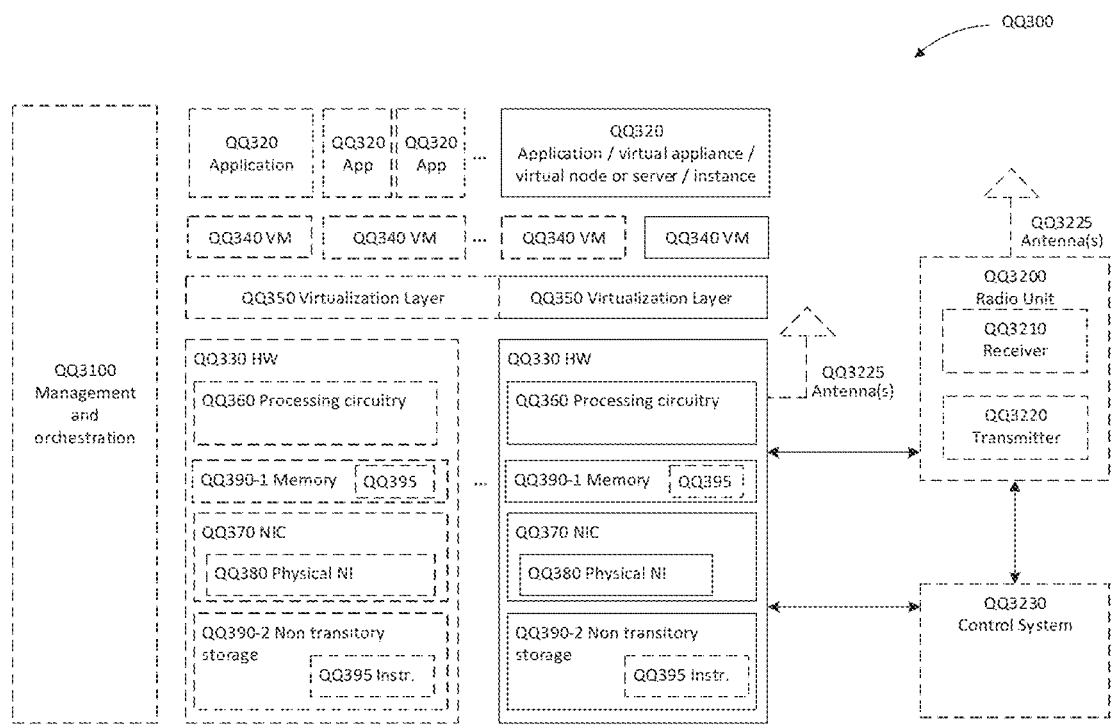
FIG. 15 schematically illustrates a virtualization environment in order to implement a method according to the present disclosure.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project, 3GPP, including a NB-IoT UE, a machine type communication, MTC, UE and/or an enhanced MTC, eMTC UE. UE QQ200, as illustrated in FIG. 15, is one example of a WD configured for communication in accordance with one or more communication standards promulgated by the $3^{rd}$ Generation Partnership Project, 3GPP, such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory, RAM, QQ217, read-only memory, ROM, QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor, DSP, together with appropriate software; or any combination of the above. For example, the processing circuitry QQ201 may include two central processing units, CPUs. Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network, LAN, a wide-area network, WAN, a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), start up, or reception of keystrokes from a keyboard that are stored in a non-volatile memory. Storage medium QQ221 may be configured to include memory such as RAM, ROM, programmable read-only memory, PROM, erasable programmable read-only memory, EPROM, electrically erasable programmable read-only memory, EEPROM, magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks, RAID, floppy disk drive, flash memory, USB flash drive, external hard disk drive, thumb drive, pen drive, key drive, high-density digital versatile disc, HD-DVD, optical disc drive, internal hard disk drive, Blu-Ray optical disc drive, holographic digital data storage, HDDS, optical disc drive, external mini-dual in-line memory module, DIMM, synchronous dynamic random access memory, SDRAM, external micro-DIMM SDRAM, smartcard memory such as a subscriber identity module or a removable user identity, SIM/RUIM, module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network, RAN, according to one or more communication protocols, such as IEEE 802.QQ2, CDMA, WCDMA, GSM, LTE, UTRAN, WiMAX, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system, GPS, to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network, LAN, a wide-area network, WAN, a computer network, a wireless network, a telecommunications network, another like network or any combination thereof. For example, network QQ243b may be a cellular network, a Wi-Fi network, and/or a near-field network. Power source QQ213 may be configured to provide alternating current, AC, or direct current, DC, power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
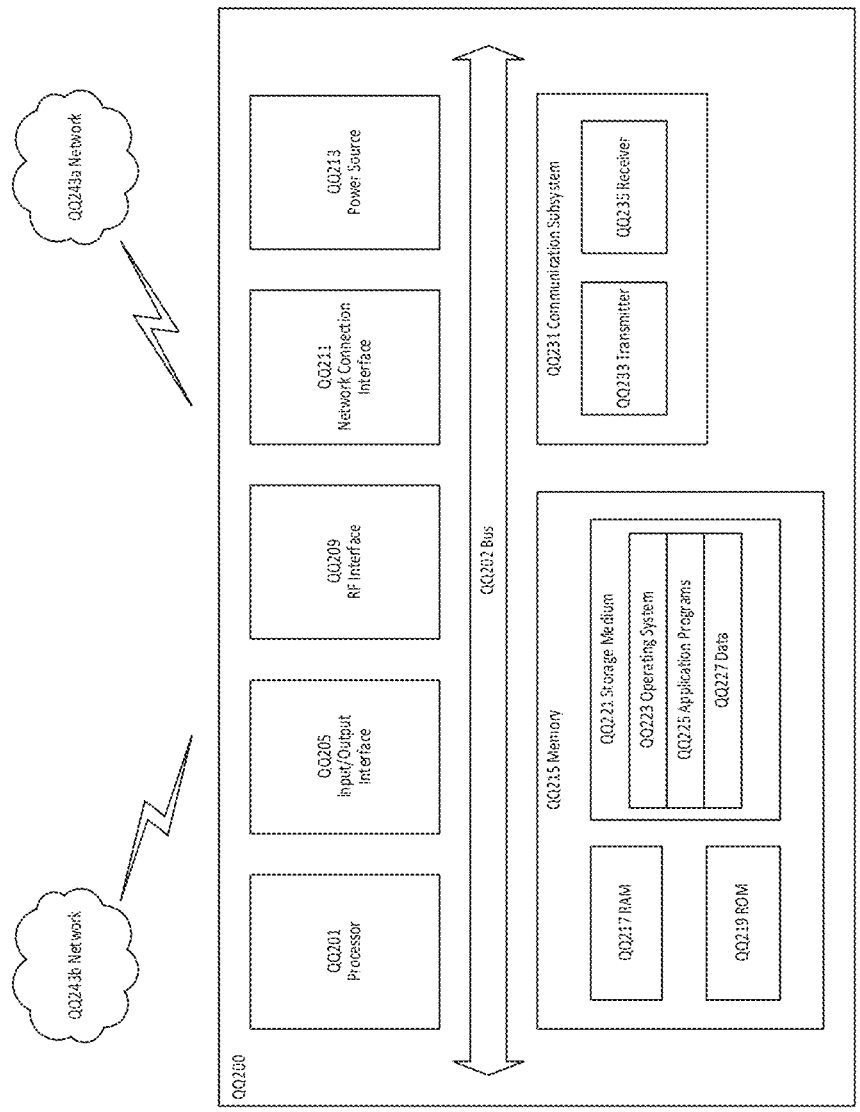
FIG. 16 schematically illustrates a virtualization environment in order to implement a method according to the present disclosure.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf, COTS, processors, dedicated Application Specific Integrated Circuits, ASICs, or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers, NICs, QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor, VMM. Virtualization layer QQ350 may present a virtual operating platform that appears like networking hardware to virtual machine QQ340.

As shown in FIG. 16, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware, such as in a data centre or customer premise equipment, CPE, where many hardware nodes work together and are managed via management and orchestration, MANO, QQ3100, which, among others, oversees lifecycle management of applications QQ320.

Virtualization of the hardware is in some contexts referred to as network function virtualization, NFV. NFV may be used to consolidate many network equipment types onto industry standard high volume server hardware, physical switches, and physical storage, which can be located in data centres, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements, VNE.

Still in the context of NFV, Virtual Network Function, VNF, is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
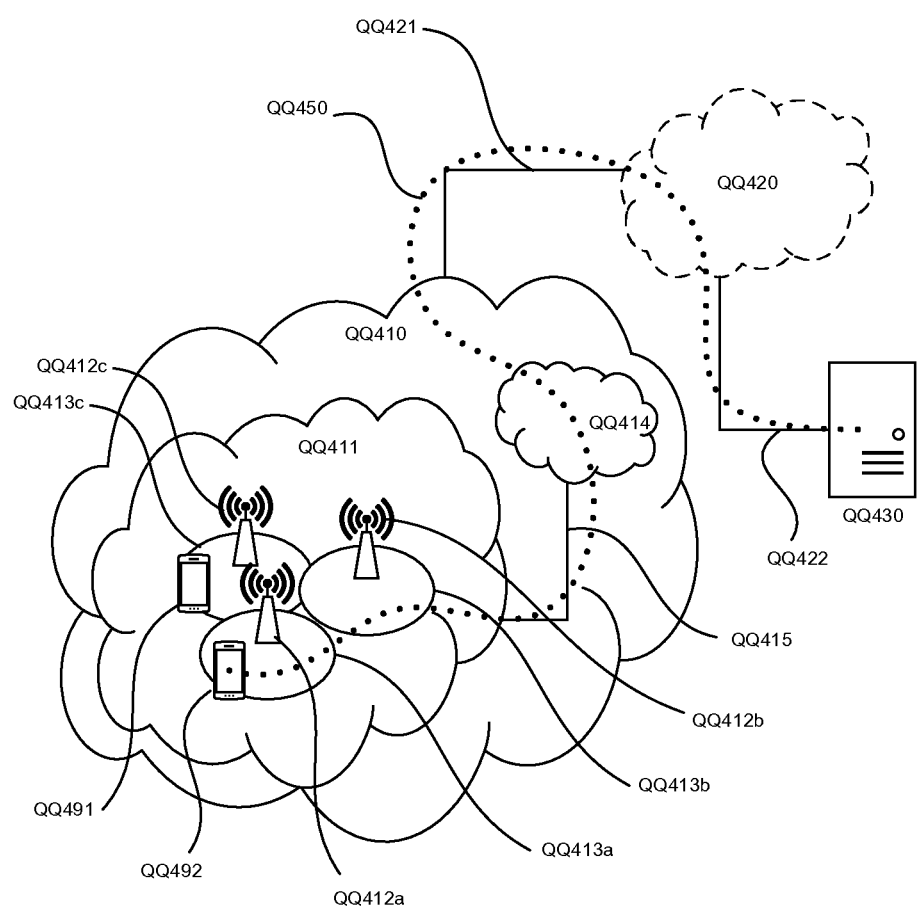
FIG. 17 illustrates a telecommunication network connected via an intermediate network to a host computer in accordance with some embodiments.

FIG. 17 illustrates a telecommunication network connected via an intermediate network to a host computer in accordance with some embodiments. In particular, with reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top, OTT, connection QQ450. Host computer QQ430 and the connected UEs QQ491, QQ492 are configured to communicate data and/or signalling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
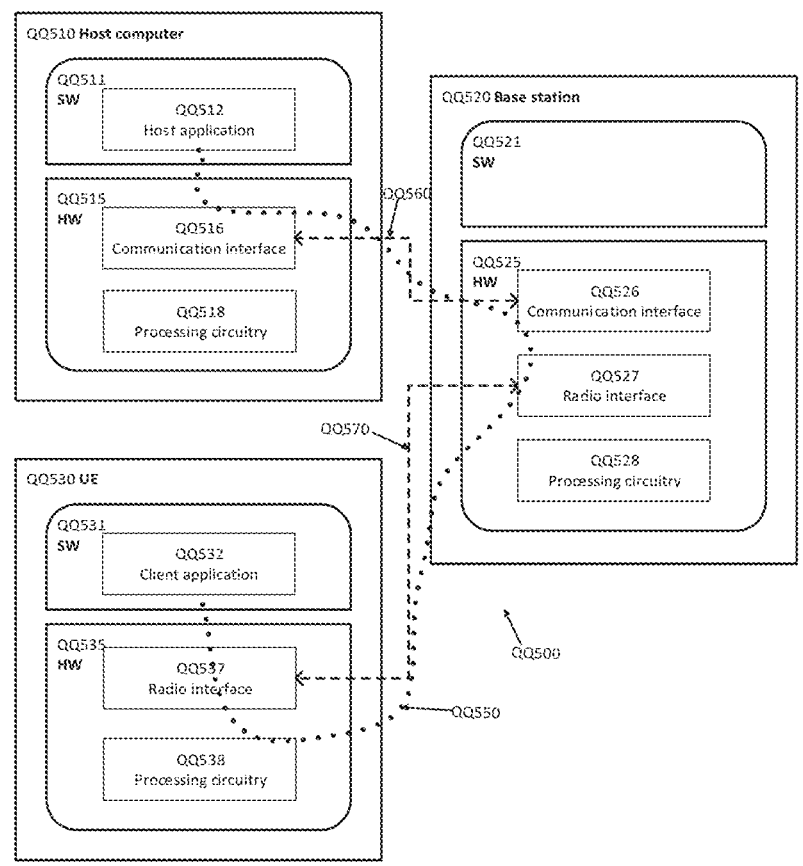
FIG. 18 illustrates host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. FIG. 18 illustrates host computer communicating via a base station with a user equipment over a partially wireless connection in accordance with some embodiments. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its' hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the radio node power consumption and spectrum efficiency, and thereby provide benefits such as extended battery lifetime.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signalling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
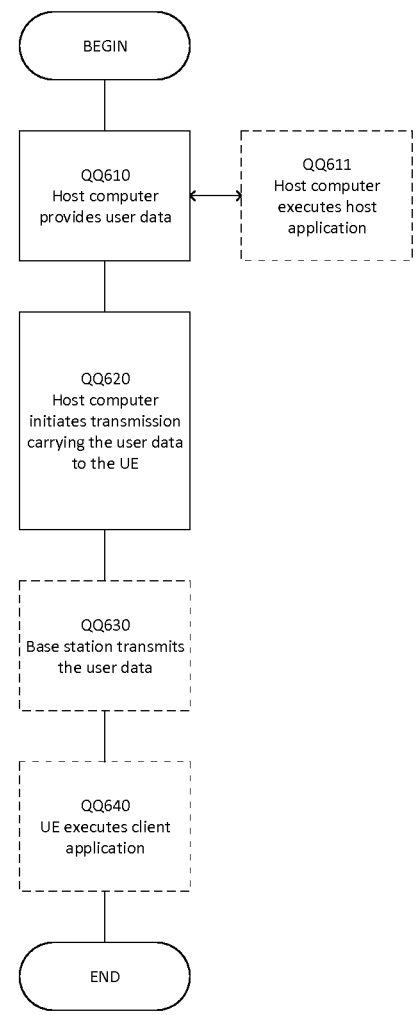
FIG. 19-22 illustrates different method embodiments according to the present disclosure.

FIG. 19 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 19 will be included in this section. In step QQ610, the host computer provides user data. In sub-step QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
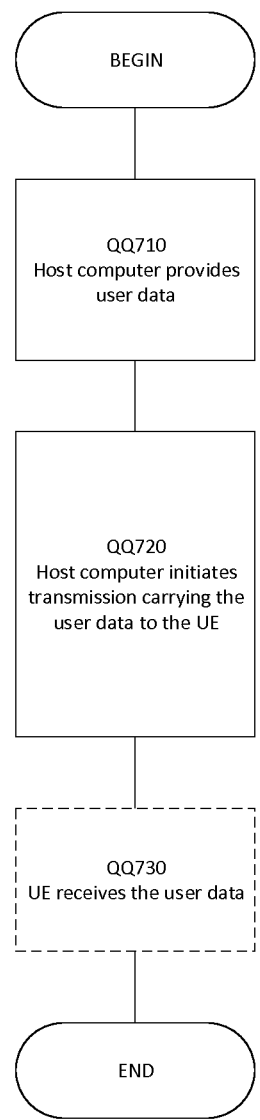

FIG. 20 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 20 will be included in this section. In step QQ710 of the method, the host computer provides user data. In an optional sub-step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
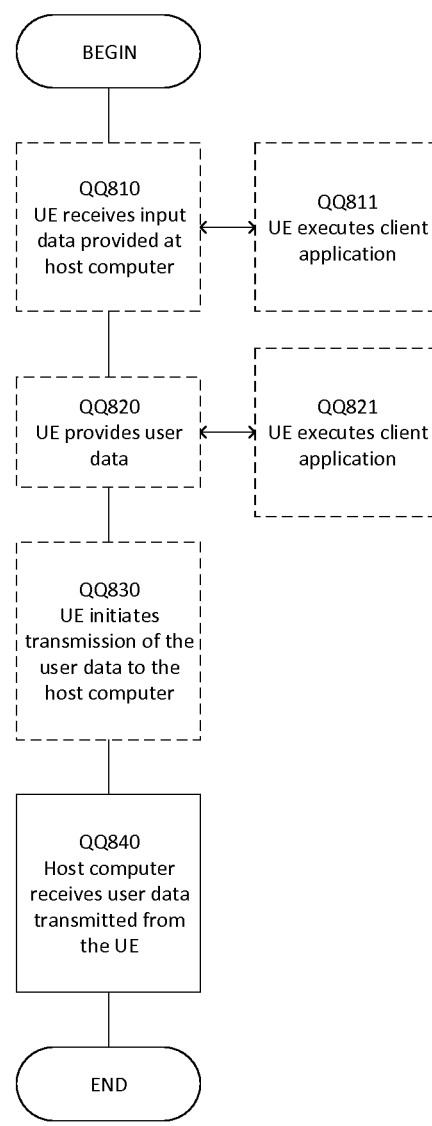

FIG. 21 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 21 will be included in this section. In step QQ810 (which may be optional), the UE receives input data provided by the host computer. Additionally or alternatively, in step QQ820, the UE provides user data. In sub-step QQ821 (which may be optional) of step QQ820, the UE provides the user data by executing a client application. In sub-step QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in sub-step QQ830 (which may be optional), transmission of the user data to the host computer. In step QQ840 of the method, the host computer receives the user data transmitted from the UE, in accordance with the teachings of the embodiments described throughout this disclosure.

Figure 22:
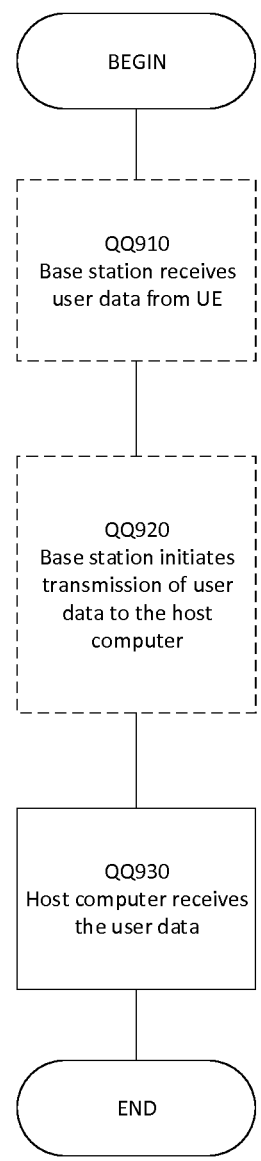

FIG. 22 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory, ROM, random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Group A Embodiments

A1. A method performed by a first radio node, the method comprising:
transmitting, to a wake-up receiver of a second radio node, a wake-up signal that indicates a frequency channel on which the second radio node is to transmit a response;
responsive to transmitting the wake-up signal, receiving a response from the second radio node on the frequency channel indicated; and
responsive to receiving the response, transmitting data from the first radio node to the second radio node.

A2. The method of embodiment A1, wherein the response is a request to initiate a connection between the first radio node and the second radio node, wherein the method further comprises initiating the connection between the first radio node and the second radio node as requested, and wherein the data is transmitted from the first radio node to the second radio node over the connection.

A3. The method of any of embodiments A1-A2, wherein the response is an advertising indication or an advertising packet.

A4. The method of embodiment A1, wherein the second radio node is a low-power node and the first radio node is a friend node that has a friendship relationship with the low-power node, and wherein the response is a friend poll that polls the friend node for whether the friend node has any data to transmit to the low-power node.

A5. The method of any of embodiments A1-A4, wherein the second radio node is a low-power node and the first radio node is a friend node that has a friendship relationship with the low-power node A6. The method of any of embodiments A1-A5, wherein the frequency channel indicated is one of multiple advertising channels on which the response is transmittable.

A7. The method of any of embodiments A1-A5, wherein the frequency channel indicated is a frequency channel on which the wake-up signal was transmitted.

A8. A method performed by a first radio node, the method comprising:
transmitting, to a wake-up receiver of a second radio node, a wake-up signal that indicates the first radio node does not have any data to send to the second radio node;
responsive to transmitting the wake-up signal, receiving a response from the second radio node.

A9. The method of embodiment A8, further comprising transmitting an acknowledgement of the response to the second radio node.

A10. The method of any of embodiments A8-A9, wherein the response is an advertising indication or an advertising packet.

A11. The method of any of embodiments A8-A10, wherein the second radio node is a low-power node and the first radio node is a friend node that has a friendship relationship with the low-power node.

AA. The method of any of the previous embodiments, further comprising:

providing user data; and forwarding the user data to a host computer via the transmission to a base station.

Group B Embodiments

B1. A method performed by a second radio node, the method comprising:

receiving, at a wake-up receiver of the second radio node, a wake-up signal from a first radio node, wherein the wake-up signal indicates a frequency channel on which the second radio node is to transmit a response to the first radio node;

responsive to receiving the wake-up signal, transmitting a response from the second radio node to the first radio node on the frequency channel indicated; and after transmitting the response, receiving data at the second radio node from the first radio node.

B2. The method of embodiment B1, wherein the response is a request to initiate a connection between the first radio node and the second radio node, wherein the method further comprises establishing the connection as initiated by the first radio node in accordance with the request, and wherein the data is received from the first radio node over the connection.

B3. The method of any of embodiments B1-B2, wherein the response is an advertising indication or an advertising packet.

B4. The method of embodiment B1, wherein the second radio node is a low-power node and the first radio node is a friend node that has a friendship relationship with the low-power node, and wherein the response is a friend poll that polls the friend node for whether the friend node has any data to transmit to the low-power node.

B5. The method of any of embodiments B1-B4, wherein the second radio node is a low-power node and the first radio node is a friend node that has a friendship relationship with the low-power node B6. The method of any of embodiments B1-B5, wherein the frequency channel indicated is one of multiple advertising channels on which the response is transmittable.

B7. The method of any of embodiments B1-B5, wherein the frequency channel indicated is a frequency channel on which the wake-up signal was received.

B8. The method of any of embodiments B1-B7, further comprising, in response to the wake-up signal, waking up a radio of the second radio node and/or awakening the second radio node from a sleep state.

B9. A method performed by a second radio node, the method comprising:

receiving, at a wake-up receiver of the second radio node, a wake-up signal from a first radio node, wherein the wake-up signal indicates the first radio node does not have any data to send to the second radio node;

responsive to receiving the wake-up signal, transmitting a response from the second radio node to the first radio node.

B10. The method of embodiment B9, further comprising receiving an acknowledgement of the response from the first radio node.

B11. The method of embodiment B10, further comprising:

in response to the wake-up signal, waking up a radio of the second radio node and/or awakening the second radio node from a sleep state; and in response to the acknowledgement, putting the radio to sleep and/or operating the second radio node in the sleep state.

B12. The method of any of embodiments B9-B11, wherein the response is an advertising indication or an advertising packet.

B13. The method of any of embodiments B9-B12, wherein the second radio node is a low-power node and the first radio node is a friend node that has a friendship relationship with the low-power node.

BB. The method of any of the previous embodiments, further comprising:

obtaining user data; and forwarding the user data to a host computer or a wireless device.

Group X Embodiments

X1. A method performed by a first radio node, the method comprising:

transmitting, to a wake-up receiver of a second radio node, a wake-up signal over a transmission frequency bandwidth that:

is wider than a reception frequency bandwidth over which the wake-up signal is to be received; and/or accounts for uncertainty in a center frequency at which the wake-up signal is to be received.

X2. The method of embodiment X1, wherein the wake-up signal is transmitted as a single wideband signal over the transmission frequency bandwidth.

X3. The method of embodiment X1, wherein the wake-up signal is transmitted as multiple narrowband signals in different respective portions of the transmission frequency bandwidth.

X4. The method of any of embodiments X1-X3, wherein the second radio node is a low-power node and the first radio node is a friend node that has a friendship relationship with the low-power node.

X5. The method of any of embodiments X1-X4, further comprising:

responsive to transmitting the wake-up signal, receiving a response from the second radio node; and responsive to receiving the response, transmitting data from the first radio node to the second radio node.

X6. The method of embodiment X5, wherein the response is a request to initiate a connection between the first radio node and the second radio node, wherein the method further comprises initiating the connection between the first radio node and the second radio node as requested, and wherein the data is transmitted from the first radio node to the second radio node over the connection.

X7. The method of any of embodiments X5-X6, wherein the response is an advertising indication or an advertising packet.

Group Y Embodiments

Y1. A method performed by a first radio node, the method comprising:

periodically receiving wake-up receiver beacons from a second radio node;

determining, based on the received wake-up receiver beacons, times at which to transmit wake-up signals to a wake-up receiver of the second radio node; and transmitting wake-up signals to the wake-up receiver of the second radio node at the determined times.

Y2. The method of embodiment Y1, further comprising estimating a time drift of the second radio node using the received wake-up receiver beacons, and wherein the times are determined based on the estimated time drift.

Y3. The method of any of embodiments Y1-Y2, wherein the wake-up receiver beacons are advertising packets.

Y4. The method of any of embodiments Y1-Y2, wherein the wake-up receiver beacons are data messages published periodically by the second radio node.

Y5. The method of any of embodiments Y1-Y4, wherein the wake-up receiver beacons are aligned with periodic data transmission timing of the second radio node and/or encapsulate application data messages.

Y6. The method of any of embodiments Y1-Y5, wherein the second radio node is a low-power node and the first radio node is a friend node that has a friendship relationship with the low-power node.

Y7. The method of any of embodiments Y1-Y6, wherein a time interval between the wake-up receiver beacons depends at least in part on a time drift rate of the second radio node and/or on how much a frequency of the wake-up receiver of the second radio node is allowed to drift between successive wake-up receiver beacons.

Y8. The method of any of embodiments Y1-Y7, further comprising transmitting acknowledgement of the wake-up beacons to the second radio node.

Group Z Embodiments

Z1. A method performed by a second radio node configured with a wake-up receiver and a radio, the method comprising:
periodically waking up the radio of the second radio node and transmitting, from the radio, wake-up receiver beacons to a first radio node; and
based on periodic transmission of the wake-up receiver beacons from the radio, calibrating a frequency of the wake-up receiver.

Z2. The method of embodiment Z1, further comprising, in between periodic transmissions of the wake-up receiver beacons, operating the radio in a sleep state and using the wake-up receiver to monitor for a wake-up signal from the first radio node.

Z3. The method of any of embodiments Z1-Z2, further comprising performing frequency generation in between periodic transmissions of the wake-up receiver beacons using a free-running oscillator.

Z4. The method of any of embodiments Z1-Z3, wherein the wake-up receiver beacons are advertising packets.

Z5. The method of any of embodiments Z1-Z4, wherein the wake-up receiver beacons are data messages published periodically by the second radio node.

Z6. The method of any of embodiments Z1-Z4, wherein the wake-up receiver beacons are aligned with periodic data transmission timing of the second radio node and/or encapsulate application data messages.

Z7. The method of any of embodiments Z1-Z6, wherein the second radio node is a low-power node and the first radio node is a friend node that has a friendship relationship with the low-power node.

Z8. The method of any of embodiments Z1-Z7, wherein a time interval between the wake-up receiver beacons depends at least in part on a time drift rate of the second radio node and/or on how much a frequency of the wake-up receiver of the second radio node is allowed to drift between successive wake-up receiver beacons.

Z9. The method of any of embodiments Z1-Z8, further comprising receiving acknowledgement of the wake-up beacons from the first radio node.

Group C Embodiments

C1. A first radio node configured to perform any of the steps of any of the Group A, X, or Y embodiments.

C2. A first radio node comprising processing circuitry configured to perform any of the steps of any of the Group A, X, or Y embodiments.

C3. A first radio node comprising:
communication circuitry; and
processing circuitry configured to perform any of the steps of any of the Group A, X, or Y embodiments.

C4. A first radio node comprising:
processing circuitry configured to perform any of the steps of any of the Group A, X, or Y embodiments; and
power supply circuitry configured to supply power to the first radio node.

C5. A first radio node comprising:
processing circuitry and memory, the memory containing instructions executable by the processing circuitry whereby the first radio node is configured to perform any of the steps of any of the Group A, X, or Y embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A, X, or Y embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a first radio node, causes the first radio node to carry out the steps of any of the Group A, X, or Y embodiments.

C8. A carrier containing the computer program of embodiment C7, wherein the carrier is one of an electronic signal, optical signal, radio signal, or computer readable storage medium.

C9. A second radio node configured to perform any of the steps of any of the Group B or Z embodiments.

C10. A second radio node comprising processing circuitry configured to perform any of the steps of any of the Group B or Z embodiments.

C11. A second radio node comprising:
communication circuitry; and
processing circuitry configured to perform any of the steps of any of the Group B or Z embodiments.

C12. A second radio node comprising:
processing circuitry configured to perform any of the steps of any of the Group B or Z embodiments;
power supply circuitry configured to supply power to the second radio node.

C13. A second radio node comprising:
processing circuitry and memory, the memory containing instructions executable by the processing circuitry whereby the second radio node is configured to perform any of the steps of any of the Group B or Z embodiments.

C14. A computer program comprising instructions which, when executed by at least one processor of a second radio node, causes the second radio node to carry out the steps of any of the Group B or Z embodiments.

C15. A carrier containing the computer program of embodiment C14, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B or Z embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B or Z embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A, X, or Y embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A, X, or Y embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A, X, or Y embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A, X, or Y embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B or Z embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A, X, or Y embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method of transmitting a wake-up signal from a first node in a wireless network to a second node in said wireless network, said method comprising:

determining, by said first node, that there is an uncertainty concerning a frequency at which a wake-up receiver of said second node is to receive a wake-up signal, wherein the uncertainty is attributable to frequency drift of the wake-up receiver of said second node;

selecting, by said first node, a bandwidth for transmitting said wake-up signal based on said determined uncertainty, wherein said selecting comprises selecting a bandwidth with a width that accounts for the frequency drift of the wake-up receiver; and transmitting, by said first node, said wake-up signal at said selected bandwidth.

2. The method according to claim 1, wherein the selected bandwidth is wider than a reception frequency bandwidth over which the wake-up signal is to be received.

3. A method performed by a first node in a wireless network for determining data transmission time instances based on wake-up receiver (WUR) beacons, said method comprising:

receiving, by said first node, wake-up receiver (WUR) beacons from a second node;

estimating a time drift of the second node using the received WUR beacons;

determining, by said first node, based on said received WUR beacons, time instances for transmitting data packets to said second node, wherein the time instances are determined based on the estimated time drift; and transmitting, by said first node, data packets at said determined time instances.

4. The method according to claim 3, wherein said WUR beacons are any of:

advertising packets; and/or data messages published periodically by said second node.

5. The method according to claim 3, wherein the second node is a low-power node and the first node is a friend node that has a friendship relationship with the low-power node.

6. A method of calibrating a frequency of a receiver of a second node in a wireless network, said method comprising:

periodically waking up a primary transceiver of said second node and transmitting Wake-Up Receiver (WUR) beacons to a first node; and calibrating, by said second node, a frequency of a wake-up receiver of said second node based on said periodic transmissions of said WUR beacons;

wherein a time interval between said periodic transmissions depends at least in part on a time drift rate of the second node and/or on how much a frequency of the wake-up receiver of the second node is allowed to drift between successive WUR beacons.

7. The method according to claim 6, wherein said second node operates in a low power mode in between said periodic transmissions of said WUR beacons.

8. The method according to claim 6, wherein calibrating the frequency of the wake-up receiver of said second node comprises calibrating a centre frequency of the wake-up receiver to a nominal frequency, as needed to compensate for unintended drift of the centre frequency away from the nominal frequency in between periodic transmissions of the WUR beacons.

9. The method according to claim 6, wherein periodically waking up the primary transceiver of said second node and transmitting WUR beacons to the first node comprises autonomously waking up the primary transceiver of said second node at regular intervals, unsolicited by any wake-up signal, in order to transmit WUR beacons to the first node.

10. A first node configured for use in a wireless network, wherein said first node comprises:

communication circuitry; and processing circuitry configured to:

determine that there is an uncertainty concerning a frequency at which a wake-up receiver of a second node is to receive a wake-up signal, wherein the uncertainty is attributable to frequency drift of the wake-up receiver of said second node;

select a bandwidth for transmitting said wake-up signal based on said determined uncertainty, wherein said selecting comprises selecting a bandwidth with a width that accounts for the frequency drift of the wake-up receiver; and transmit said wake-up signal at said selected bandwidth.

11. The first node according to claim 10, the processing circuitry further configured to establish, a connection between said first and second nodes in order to transfer data between said first and second nodes.

12. The first node according to claim 10, wherein said first node is a low power node, wherein the processing circuitry is configured to establish a friendship relation with said second node in said wireless network.

13. The first node according to claim 10, the processing circuitry further configured to:
   receive Wake-up receiver (WUR) beacons from said second node;
   determine, based on said received WUR beacons, time instances for transmitting data packets to said second node; and
   transmit data packets at said determined time instances.

14. The first node according to claim 10, wherein said wake-up signal is transmitted as at least two packets, and wherein a carrier frequency used for transmission of said at least two packets is changed by an amount that is less than or equal to a bandwidth of said transmitted wake-up signal.

* * * * *